(12) United States Patent
Syamakumari et al.

(10) Patent No.: US 9,631,066 B2
(45) Date of Patent: Apr. 25, 2017

(54) HIGHLY FLUORESCENT MONODISPERSE, CROSS-LINKED POLYMER MICROBEADS

(71) Applicant: COUNCIL OF SCIENTIFIC AND INDUSTRIAL RESEARCH, New Delhi (IN)

(72) Inventors: Asha Syamakumari, Pune (IN); Swapnil Laxman Sonawane, Pune (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/276,729

(22) Filed: May 13, 2014

(65) Prior Publication Data
US 2015/0183956 A1 Jul. 2, 2015

(30) Foreign Application Priority Data
Dec. 30, 2013 (IN) .......................... 3810/DEL/2013

(51) Int. Cl.
*C08K 5/134* (2006.01)
*C08K 5/3437* (2006.01)
*C08K 5/00* (2006.01)

(52) U.S. Cl.
CPC ............ *C08K 5/3437* (2013.01); *C08K 5/134* (2013.01); *C08K 5/0025* (2013.01)

(58) Field of Classification Search
CPC ......... G02F 1/3611; G02F 1/3612; C08J 3/24; C08F 8/00; C08F 257/00; C08F 257/02; C08F 263/00; C08F 265/04; C08F 2810/20; C08F 2500/25
See application file for complete search history.

(56) References Cited

U.S. PATENT DOCUMENTS 5,470,502 A 11/1995 Hahn et al.
6,165,661 A 12/2000 Hsiao et al.

FOREIGN PATENT DOCUMENTS

CN 101824191 A 9/2010

OTHER PUBLICATIONS

Zhu, L. et al. Journal of the American Chemical Society vol. 129 pp. 3524-3526 published Mar. 2007.*
Sonawane, S.L. et al ACS Applied Materials Inte4rfaces vol. 5 pp. 12205-12214 published Nov. 2013.*
European Polymer Journal 45 (2009) 550-556, Qi Zhang, et al.
J. Mater. Chem., 2009, 19, 2018-2025 by Qing-Hao Liu, et al.
M. A. Winnik et al, J. Am. Chem. Soc. 2004, 126, 6562-6563.
Narayanan, K.et al in Macromol. Sci. Polym. Rev. C41 (1&2), 2001, 79-94.
Opt Lett. Apr. 15, 2013; 38(8):1197-9 by Lowe KT et al.

* cited by examiner

*Primary Examiner* — Irina S Zemel
*Assistant Examiner* — Jeffrey Lenihan
(74) *Attorney, Agent, or Firm* — Lando & Anastasi, LLP

(57) ABSTRACT

The invention disclosed herein is the composition comprising a fluorescent chromophore as cross linker incorporated to polymer beads, wherein the fluorescence of the composition occurs in solid state and solution state with high quantum yield in solid state. Particularly, the invention provides fluorescent monodisperse crosslinked PS-PBIX, PS-OPVX, PS-PBITEGA, PS-PBITEGA-OPVX, PS-PBIX-OPVX, PMMA-OPVX, and PMMA-PBIX microspheres or beads, having tunable color emission such that fluorophore made using PS-PBITEGA-OPVX will emit white light. Further it discloses process for the preparation of highly fluorescent monodisperse, cross-linked polymer microbeads.

8 Claims, 23 Drawing Sheets

HIGHLY FLUORESCENT MONODISPERSE, CROSS-LINKED POLYMER MICROBEADS

CROSS-REFERENCE TO RELATED APPLICATION

This application claims the benefit of priority under 35 U.S.C. §119 to Indian Patent Application Serial No. 3810/DEL/2013 filed Dec. 30, 2013, the entire disclosure of which is hereby incorporated herein by reference in its entirety for all purposes.

TECHNICAL FIELD OF THE INVENTION

The present invention provides composition comprising a fluorescent chromophore cross linked to polymer, where the chromophore performs dual function of fluorescence and cross linker, wherein fluorescence of the composition occurs in solid state and solution state. Particularly, the invention provides fluorescent monodisperse crosslinked Polystyrene-Perylene bisimide (PS-PBIX)/Oligo (p-Phenylenevinylene) (PS-OPVX) and (PS-PBITEGX-OPVX) beads with tunable colors emission in solid state. Further it discloses process for the preparation of highly fluorescent monodisperse, cross-linked polymer microbeads.

BACKGROUND AND PRIOR ART OF THE INVENTION

Fluorescent polymer beads find application in myriad areas like multicolor emission, bar-coding, photonic crystals, self assembly study and as a standard in the fluorescence techniques like flow cytometry, cell sorting, sensing and imaging etc. Some of the important criteria for application of the fluorescent beads are monodispersity, non-leaching of the fluorophore, thermal and photo stability etc.

Fluorescent polymer particles are generally synthesized by incorporation of the dye with the polymer composite, physical adsorption, encapsulation of the dye in block copolymers by hydrophobic-hydrophilic interaction, gradual solvent evaporation, controlled mixing and so on. However these methods often face the problem of the dye leakage causing background fluorescence interference.

Synthesis of highly cross-linked polystyrene beads of 9.2 µm by seed polymerization with styrene as monomer and divinylbenzene as cross linker stained by gradual solvent evaporation method using dyes such as rhodamine 101 and acridine orange is reported in European Polymer Journal 45 (2009) 550-556 Qi Zhang, et al.

The fluorescent polymer particles can also be synthesized by post polymerization dispersion techniques. However, these systems require additional steps after polymerization and control over uniform emission and monodispersity of the polymer particle is also difficult.

To overcome these problems, copolymerization with polymerizable fluorophore and covalently attaching the fluorophore to the polymer chains is a good means to prevent leakage and obtain strongly fluorescent polymer particle with uniform distribution of the fluorophore in the polymer backbone. Preparation of polystyrene fluorescent microspheres by the dispersion copolymerization and absorption method is reported in *J. Mater. Chem.*, 2009, 19, 2018-2025 by Qing-Hao Liu, et al., whereas Laser velocimetry technique to obtain fluorescent dye-doped polystyrene microspheres is disclosed in *Opt Lett.* 2013 Apr. 15; 38(8):1197-9 by Lowe K T et al.

A polymerization methodology has also to be adopted which would allow for narrow size distribution of the fluorophore incorporated polymer.

Various polymerization techniques like suspension, emulsion, dispersion etc are utilized to obtain narrow disperse polymer beads in size ranges varying from nanometer to micrometer depending on the size requirement for different applications. Among these methods, dispersion polymerization is a very attractive one for the large-scale preparation of monodisperse polymer beads in the 0.5-15 micrometer size range. The original dispersion polymerization method as developed in the early 1960 did not facilitate the incorporation of fluorophores, functional comonomers, crosslinkers etc. Narayanan, K. et al in *Macromol. Sci. Polym. Rev.* C41 (1&2), 2001, 79-94 describes preparation of linear and crosslinked polymer microspheres by dispersion polymerization. In presence of "extra" reagents such as fluorophores, functional comonomers, crosslinkers the polymerization would lose control over particle size and especially with crosslinkers result in coagulation of the polymer.

CN101824191 discloses sulfonated polystyrene microspheres coated with a shell layer of p-phenylenevinylene (PPV) fluorescent conjugated macromolecular polymer.

U.S. Pat. No. 5,470,502 discloses a fluorescent pigment having a mean particle size of from 8 to 16 µm, comprising an apolar polymer matrix selected from the group consisting of polymethylmethacrylate, polystyrene.

U.S. Pat. No. 6,165,661 discloses photoconductive imaging members with perylene dimer photogenerating pigment mixtures.

In the early 2000s, M. A. Winnik et al showed that polymer beads with narrow size distribution could be achieved in the dispersion polymerization method by delayed introduction of the crosslinker after the nucleation stage, which they named as the "two-stage" dispersion polymerization (*J. Am. Chem. Soc.* 2004, 126, 6562-6563). Using this procedure they demonstrated the successful incorporation of up to 3 mol % of the crosslinker divinyl benzene (DVB) into PS and still obtained monodisperse particles.

PBI as well as OPV are chromophores well-known for their tendency to aggregate and lead to quenching of fluorescence in concentrated solution and solid state. Sometimes strategies like introduction of bulky substitutes that can reduce aggregation induced fluorescence quenching or positive effects of aggregate emission based on some J-type aggregates have been reported in literature especially for perylenebisimides to exhibit fluorescence in the solid state. Some bay substituted perylene bisimides have been shown to exhibit intense fluorescence emission in the solid state. The solid state emissions in most of these cases are aggregate emission in the ~600 nm range.

Although fluorescent microspheres are commercially available, there are certain disadvantages accompanied such as cost of the fluorophore, limited choice of the emission colors, leaking of dyes, high particle size, nonuniformity in dispersion, coagulation of the polymer, hence there is need to design efficient fluorescent microspheres with narrow size distribution and wide range of emission color in solid as well as solution state using easily adaptable procedure.

Therefore, the present inventors incorporated organic fluorophores as crosslinker into commercially available polymer like that of polystyrene (PS), by adopting two-stage dispersion polymerization route to produce highly fluorescent monodisperse PS beads. Among the stable organic fluorophores which have high quantum efficiency, perylene 3,4,9,10-tetracarboxylic diimide (PBI) and oligo(p-phenylenevinylene) (OPV) fluorophores are some of the most preferred due to their strong absorption and fluorescence quantum yield combined with outstanding chemical, thermal and photochemical stability.

PS beads containing both blue emitting OPV and red emitting PBI which were covalently incorporated as cross-linkers in a single polymer based solid state white light (CIE co-ordinates; X=0.33, Y=0.32) as well as multicolor emission with high quantum yield is reported from. The isolated blue emitting OPV and new Orange-red emitting PBI, were covalently incorporated into PS beads as cross-linkers. By changing the feed ratio of both the OPV and PBITEG chromophores we could tune the color in the solid state from blue to white and orange-red. As per the best of our knowledge, this is the first example of solid state white light emission from a single polymer system, where chromophore isolation was used as the strategy to obtain multiple emission from different RGB components.

SUMMARY OF THE INVENTION

Accordingly, present invention provides a fluorescent cross-linked polymer comprising a fluorescent chromophore as a cross linker incorporated into a polymer, wherein the composition exhibits fluorescence in solid state and solution state, having quantum yield in the range of (Powder) 0.25% to 0.71%.

In an embodiment of the present invention, the fluorescent chromophore as crosslinkers are selected from perylene bisimide based or oligo (p-phenylenevinylene) based cross-linkers either alone or combination thereof.

In another embodiment of the present invention, perylene bisimide based crosslinker is (PBITEGA) or (PBIX) and oligo (p-phenylenevinylene) based crosslinker is (OPVX).

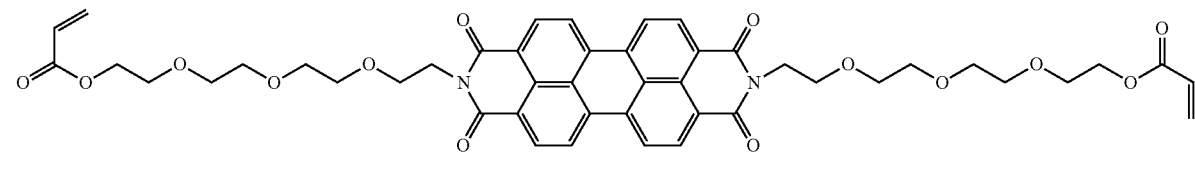

PBITEGA

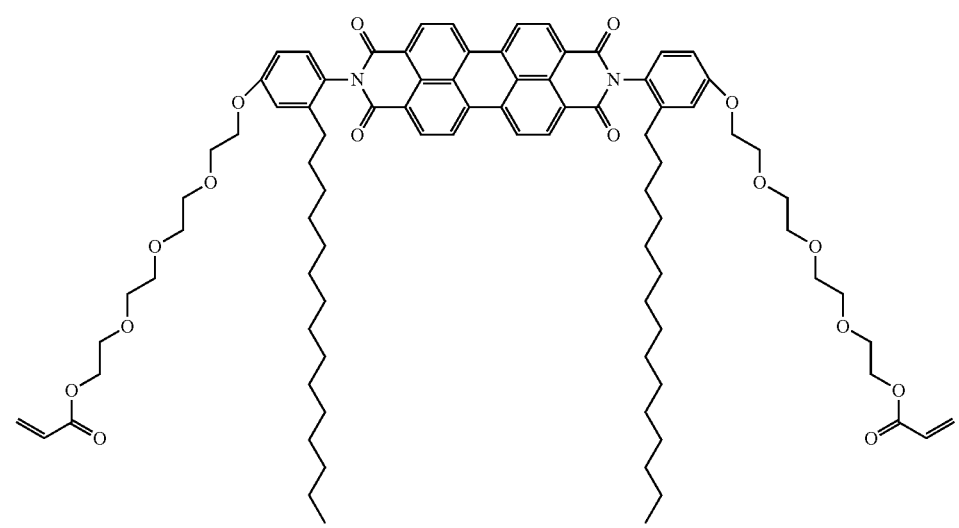

PBIX

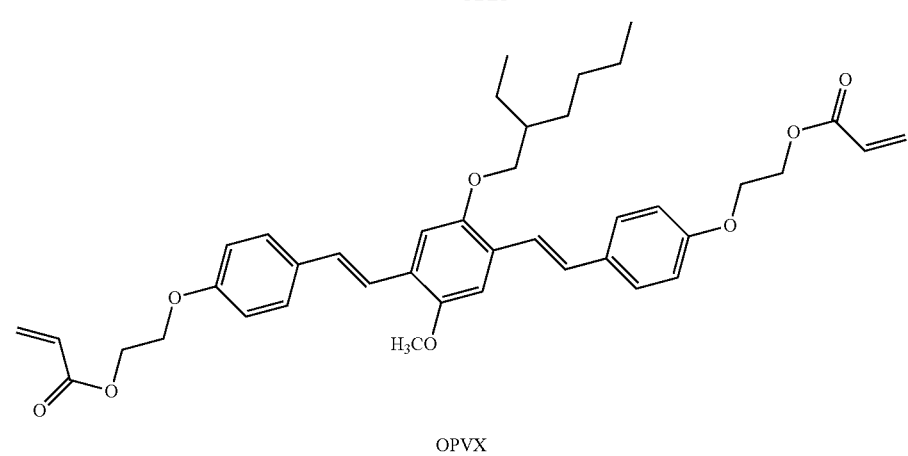

OPVX

In yet another embodiment of the present invention, the polymer is selected from the group consisting of polystyrene (PS) and polymethyl methacrylate (PMMA), preferably polystyrene.

In yet another embodiment of the present invention, the fluorescent cross-linked polymer is selected from the group consisting of PS-PBIX, PS-OPVX, PS-PBITEGA, PS-PBITEGA-OPVX, PS-PBIX-OPVX, PMMA-OPVX, and PMMA-PBIX.

In yet another embodiment of the present invention, the fluorescent cross-linked polymer PS-PBITEGA-OPVX emits white light.

In yet another embodiment of the present invention, the amount of the crosslinker is in the range of 3.4 to 14 µM with respect to the monomer.

In yet another embodiment of the present invention, the fluorescent cross-linked polymer is obtained in the form of microbeads, microspheres, balls, micro particles, nanospheres, preferably microbeads having an average diameter of 2-6 µm, preferably 2-3 µm.

In yet another embodiment, present invention provides a process for the preparation of fluorescent cross-linked polymer as claimed in claim 1 comprises dispersion of additives to the polymer beads followed by dispersion of fluorophore crosslinkers to the same to obtain monodisperse, fluorescent chromophore crosslinked polymer.

In yet another embodiment of the present invention, the additives are selected from the group consisting of solvent medium selected from methanol, ethanol, dichloromethane; surfactant/co-stabilizer, t-octyl phenoxy polyethoxyethanol; stabilizer, polyvinylpyrrolidone and initiator, azobisisobutyronitrile.

BRIEF DESCRIPTION OF THE FIGURES

Scheme 1: Synthesis of Perylenebisimide based crosslinker (PBIX), wherein Reagents: (i) TEG-Monotosylate, $K_2CO_3$, DMF, 0-25-90° C., 48 hours, $N_2$. (ii) Acryloyl Chloride, DCM, $Et_3N$, 0-25° C., 24 hours, $N_2$.

Scheme 2: Synthesis of Oligo (p-phenylenevinylene) based crosslinker (OPVX) wherein reagents (i) K-t-OBu, THF, 0-25° C., 24 hours (ii) Acryloyl Chloride, DCM, Et3N, 25° C., 24 hours, N2.

Synthesis of PBITEGX crosslinker, starts with imidization of perylenetetracarboxylic anhydride with Tetra-ethylene-hydroxyl-amine to obtain PBITEG-Diol compound and further treatment of PBITEG-Diol with acryloyl chloride, in presence of base $Et_3N$ yields PBITEGX.

Scheme 3: Synthesis of Perylenebisimide based crosslinker (PBITEG) wherein reagents acryloyl chloride, DCM, $Et_3M$, 0-25° C., 24 h, $N_2$.

Figure 1:
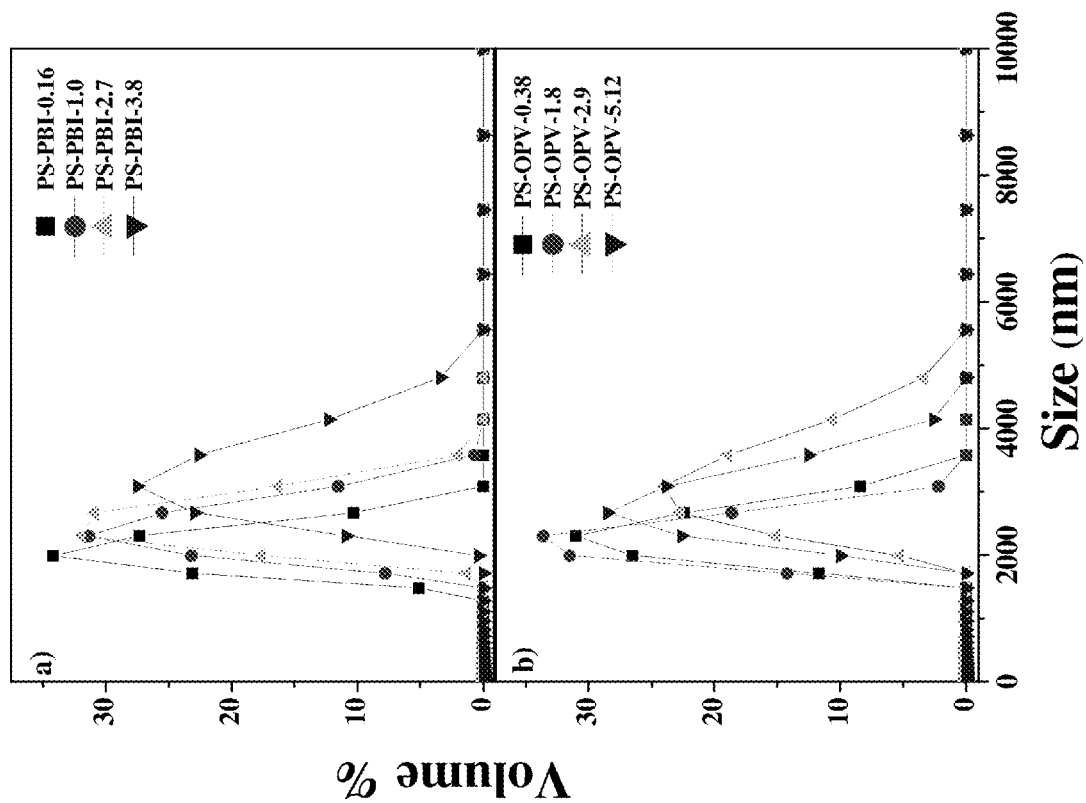

FIG. 1: Depicts volume-average size distribution of (a) PS-PBI-X and (b) PS-OPV-X series in ethanol dispersion obtained by dynamic light scattering (DLS) analysis.

Figure 2:
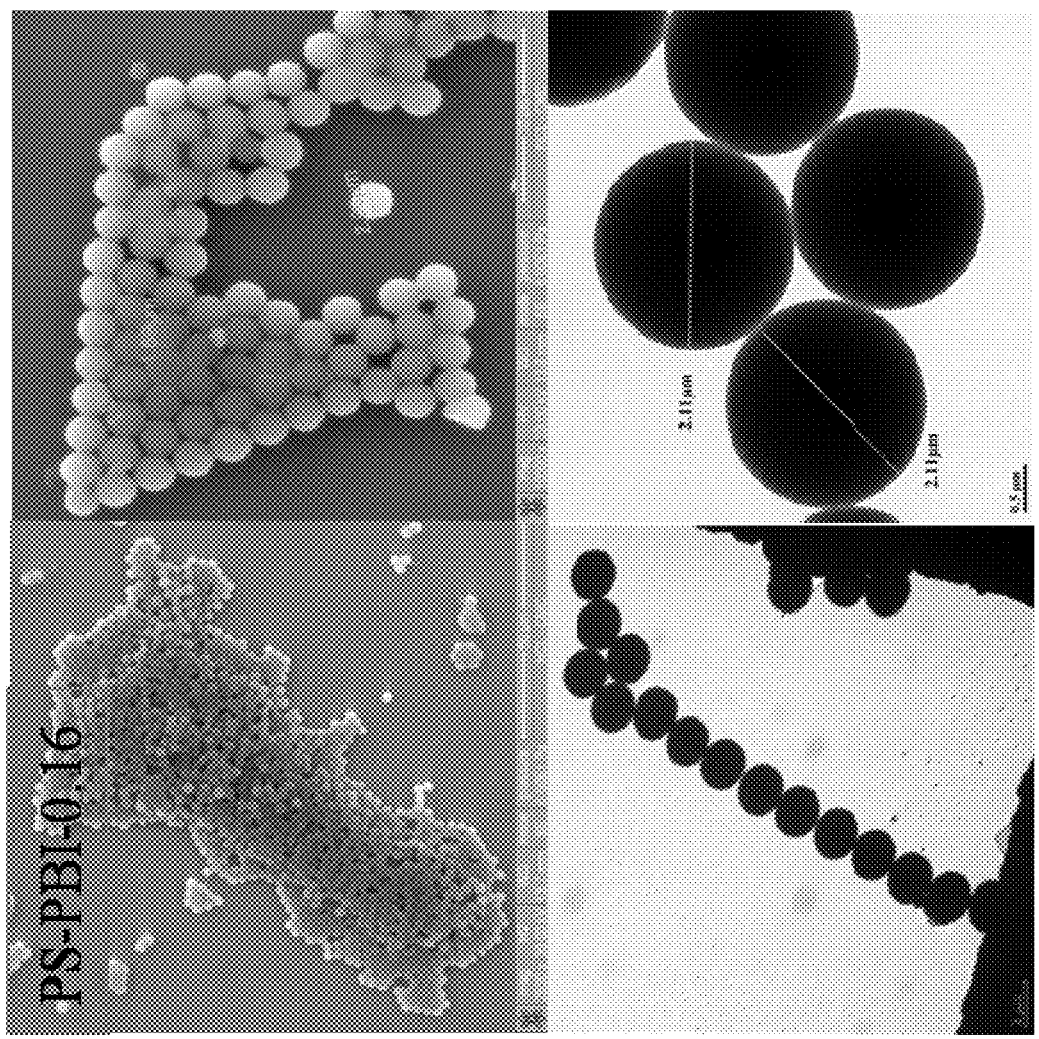

FIG. 2: Depicts (top) SEM images of PS-PBI-0.16 drop cast on silicon wafer (1 mg/2 mL ethanol dispersion) and (bottom) TEM images (0.5 mg/2 mL ethanol dispersion) drop cast on carbon coated copper grids.

Figure 3:
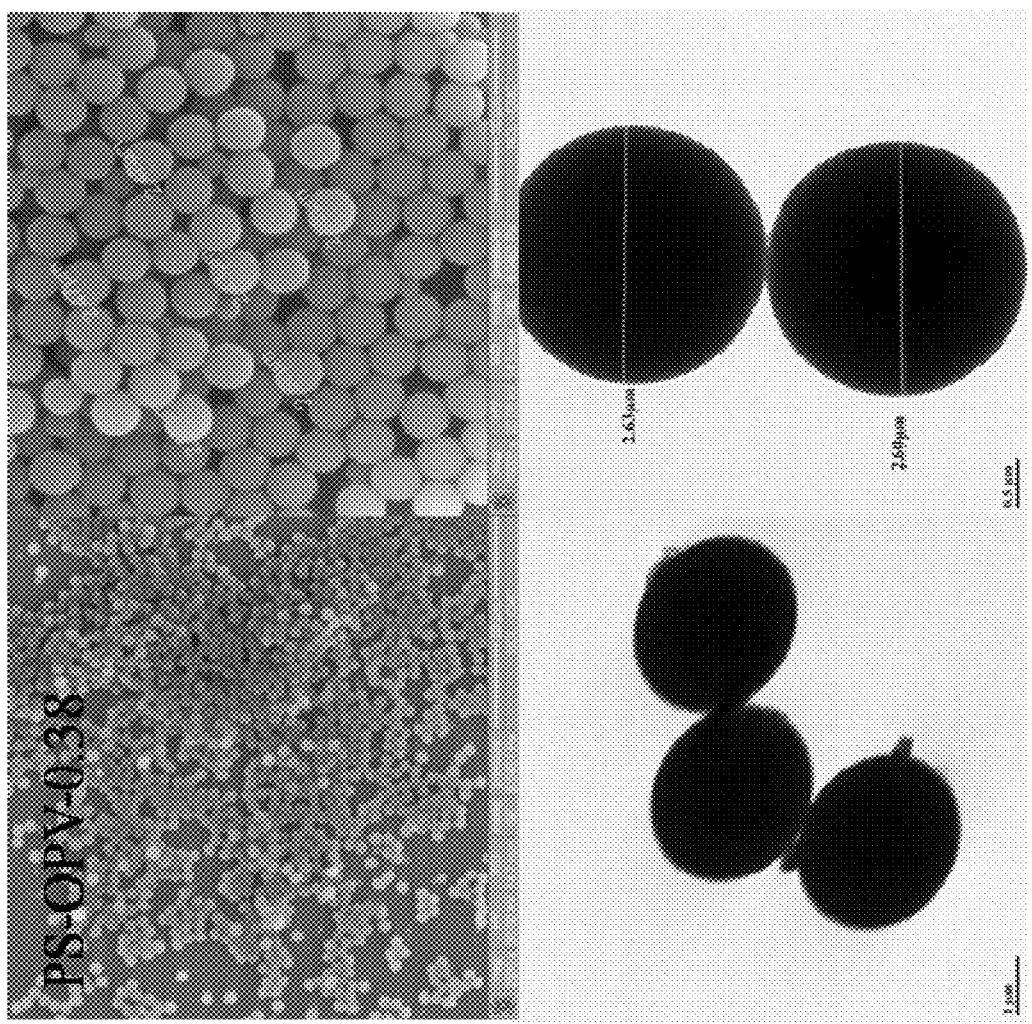

FIG. 3: Depicts (top) SEM images of PS-OPV-0.38 drop cast on silicon wafer (1 mg/2 mL ethanol dispersion) and (bottom) TEM images (0.5 mg/2 mL ethanol dispersion) drop cast on carbon coated copper grids.

Figure 4:
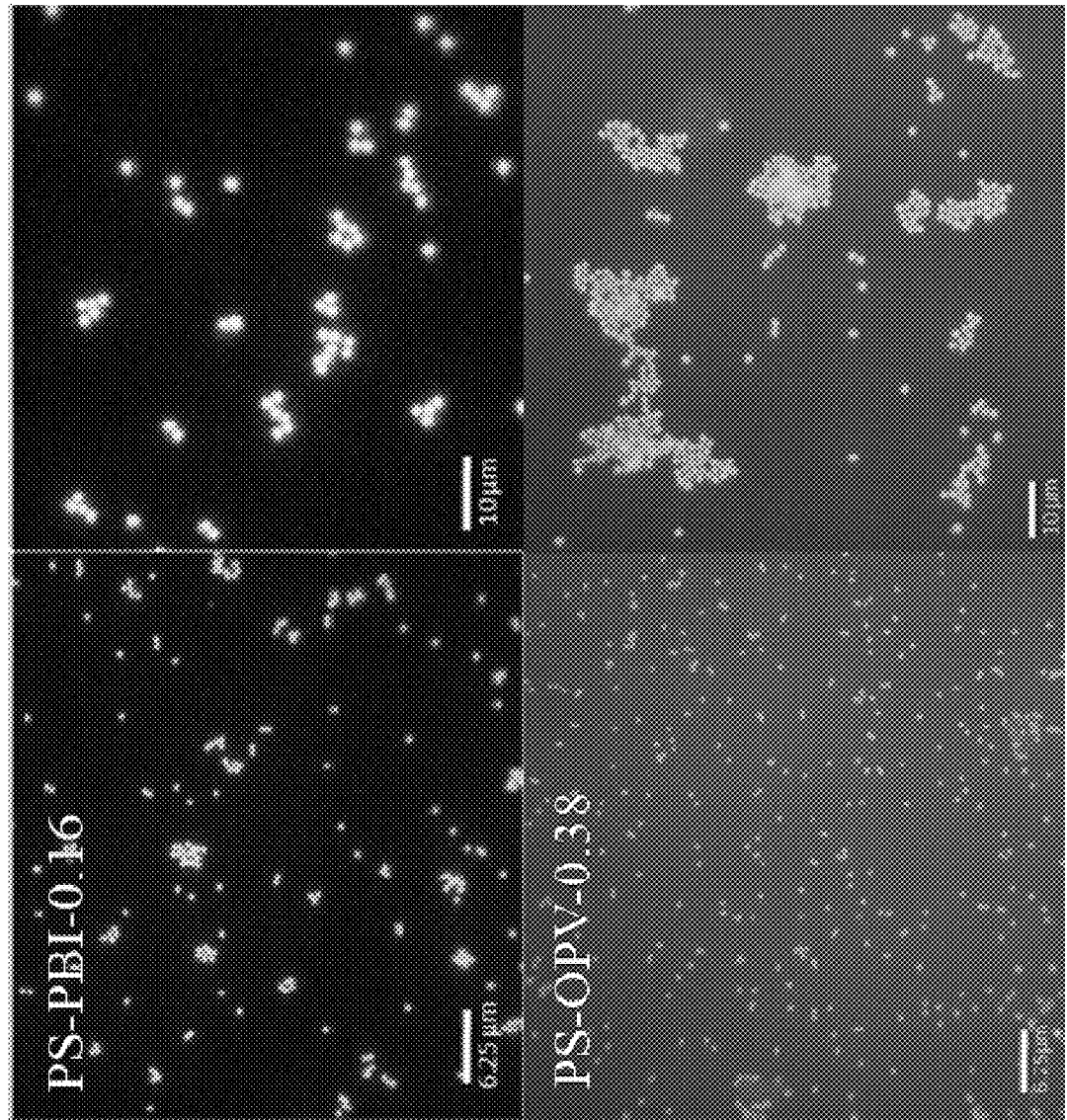

FIG. 4: Depicts fluorescence optical microscopy images of PS-PBI-0.16 using 500-550 nm, red filter (top) and PS-OPV-0.38 is using 488-520 nm, green filter (bottom).

Figure 5:
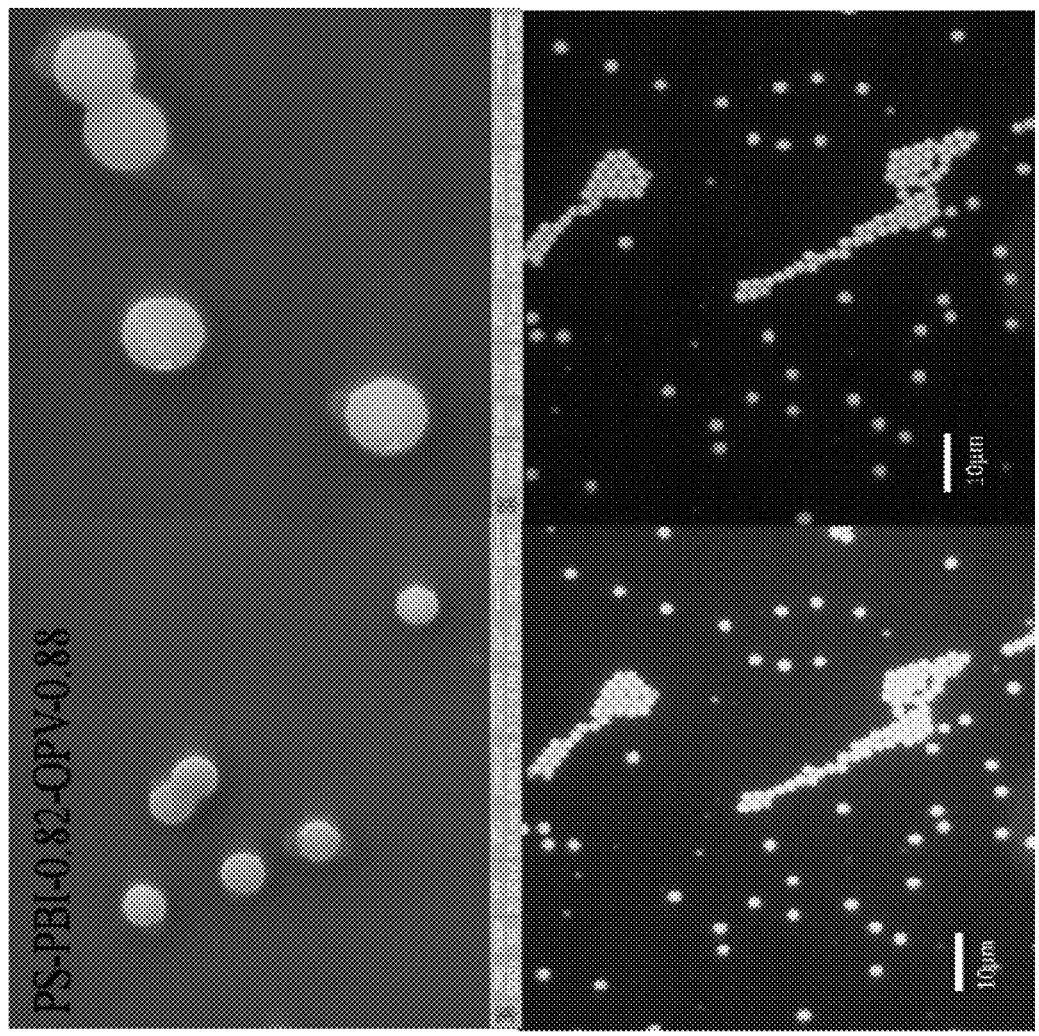

FIG. 5: Depicts (top) SEM images of PS-PBI-0.82-OPV-0.88 drop cast on silicon wafer (1 mg/2 mL ethanol dispersion) and (bottom) Fluorescence optical microscopy images using 500-550 nm, red filter for PBI and using 488-520 nm, green filter for OPV imaging.

Figure 6:
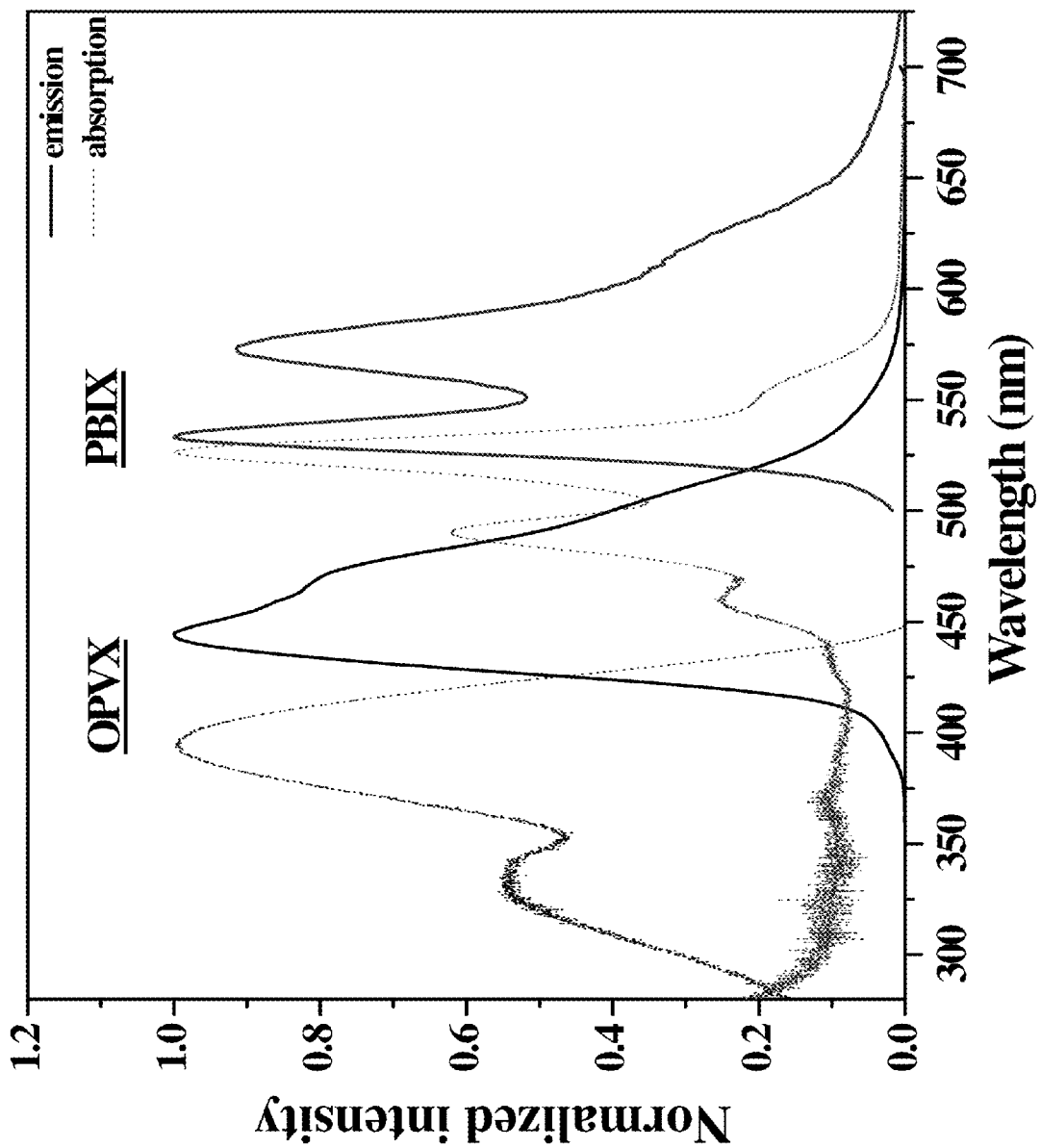

FIG. 6: Depicts normalized absorption and Emission spectra of PBIX and OPVX in $CHCl_3$ (0.1 OD at 370 nm; $\lambda_{ex}$=370 nm for OPVX and 0.1 OD at 527 nm $\lambda_{ex}$=490 nm for PBIX).

Figure 7:
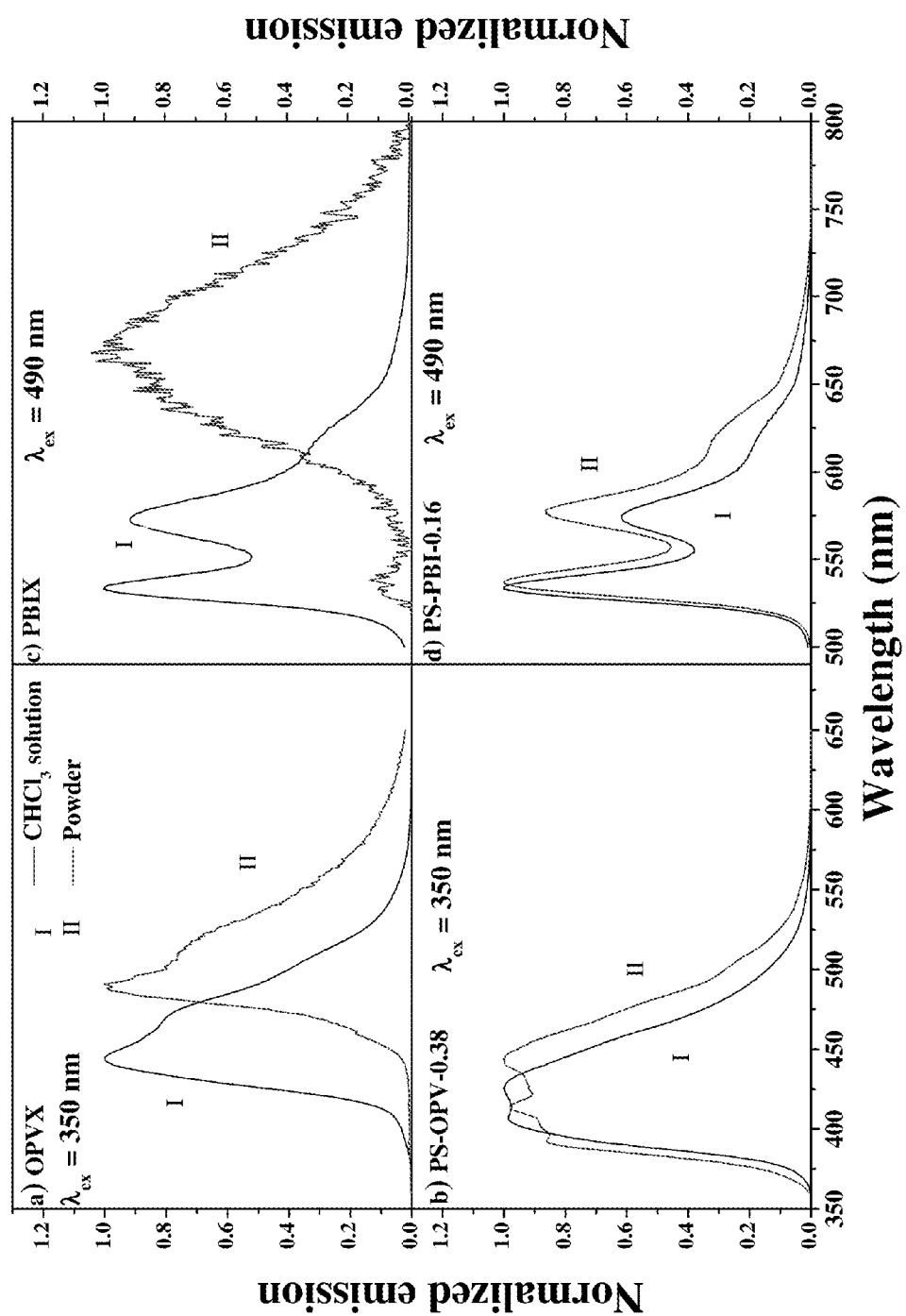

FIG. 7: Depicts comparison of the emission spectra in the solution state in chloroform and solid state for the cross-linkers and polymer. a) OPVX in $CHCl_3$ and as powder upon excitation at 350 nm (b) PS-OPV-0.38 in $CHCl_3$ and as powder upon excitation at 350 nm (c) PBIX in $CHCl_3$ and as powder upon excitation at 490 nm (d) PS-PBI-0.16 in $CHCl_3$ and as powder upon excitation at 490 nm.

Figure 8:
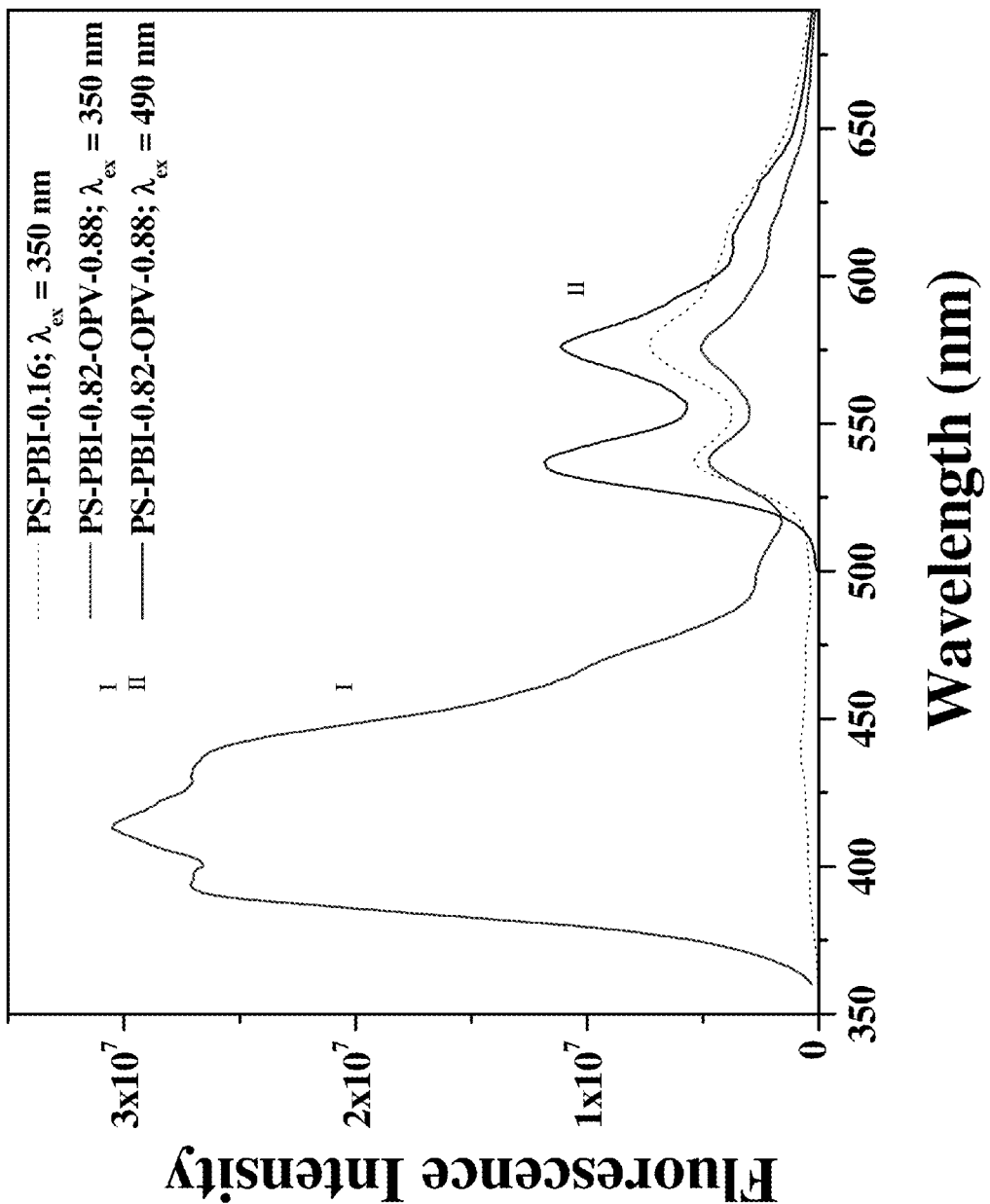

FIG. 8: Depicts solid state emission spectra of PS-PBI-0.82-OPV-0.88 upon excitation at 350 and 490 nm. The emission from PS-PBI-0.16 upon excitation at 350 nm is also given for comparison (dotted line).

Figure 9:
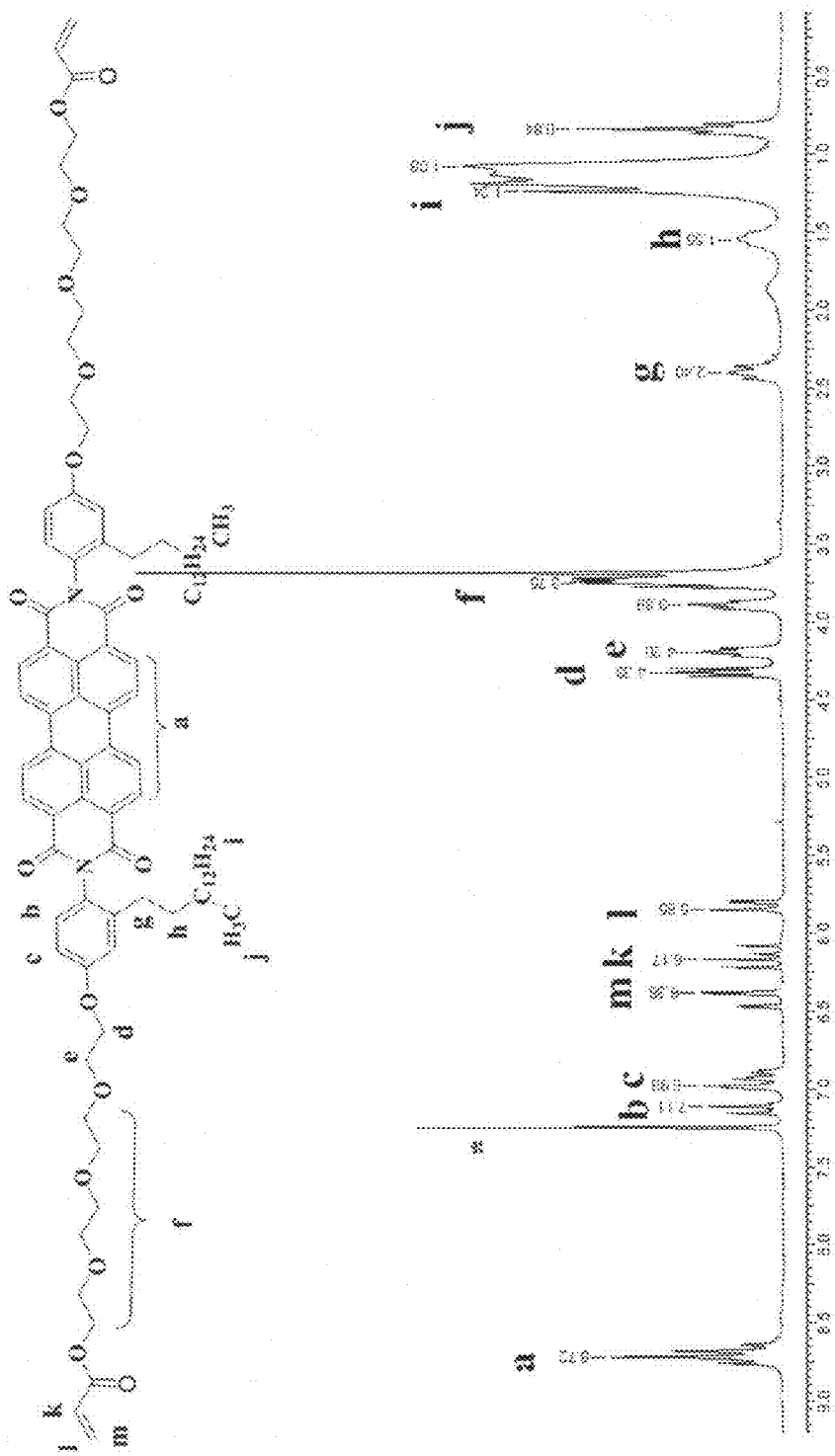

FIG. 9: Depicts $^1H$ NMR spectra of PBI-PDP-TEG-DiAcrylate recorded in $CDCl_3$.

Figure 10:
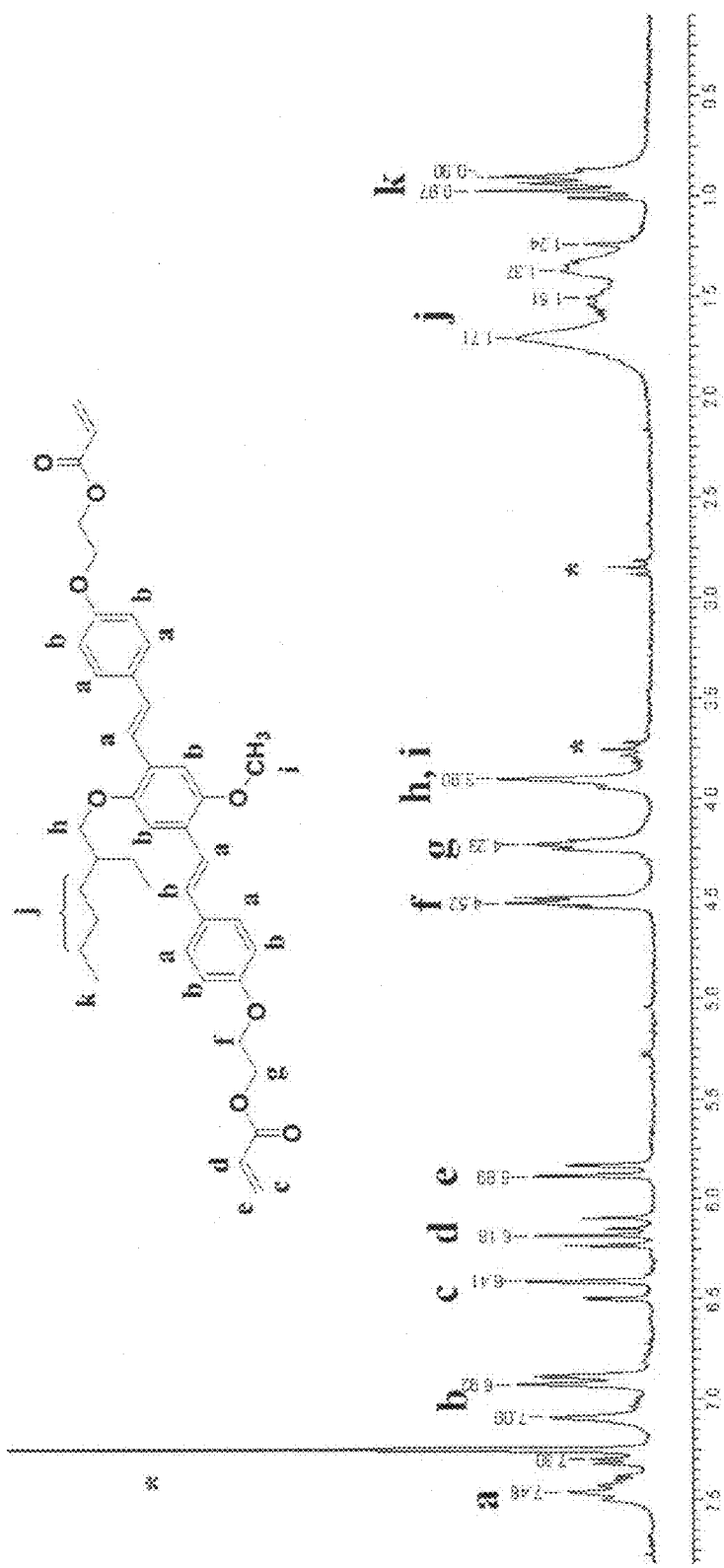

FIG. 10: Depicts $^1H$ NMR spectra of PBI crosslinker recorded in $CDCl_3$.

Figure 11:
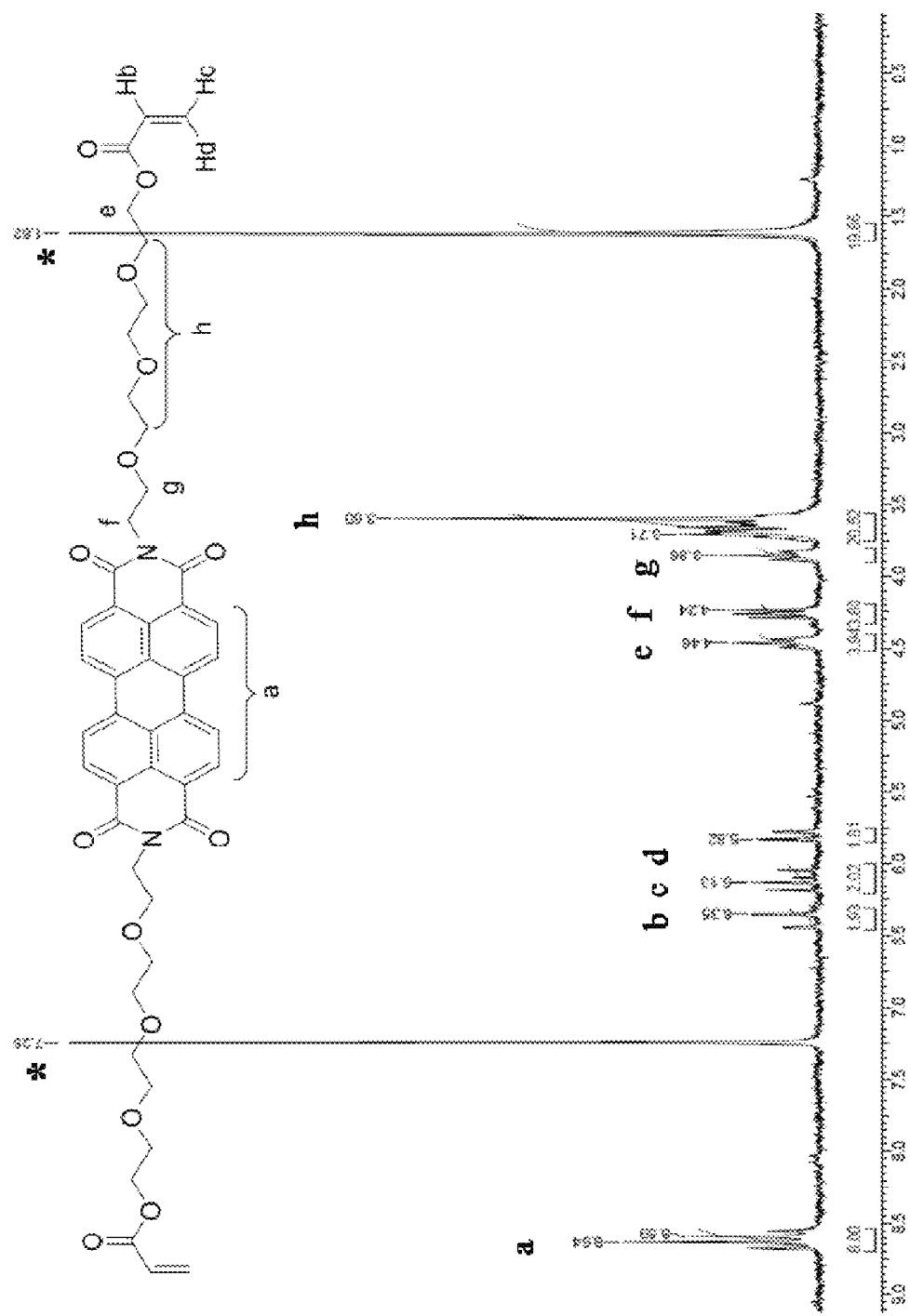

FIG. 11: Depicts $^1H$ NMR spectra of OPV crosslinker recorded in $CDCl_3$ (*: solvent peak)

Figure 12:
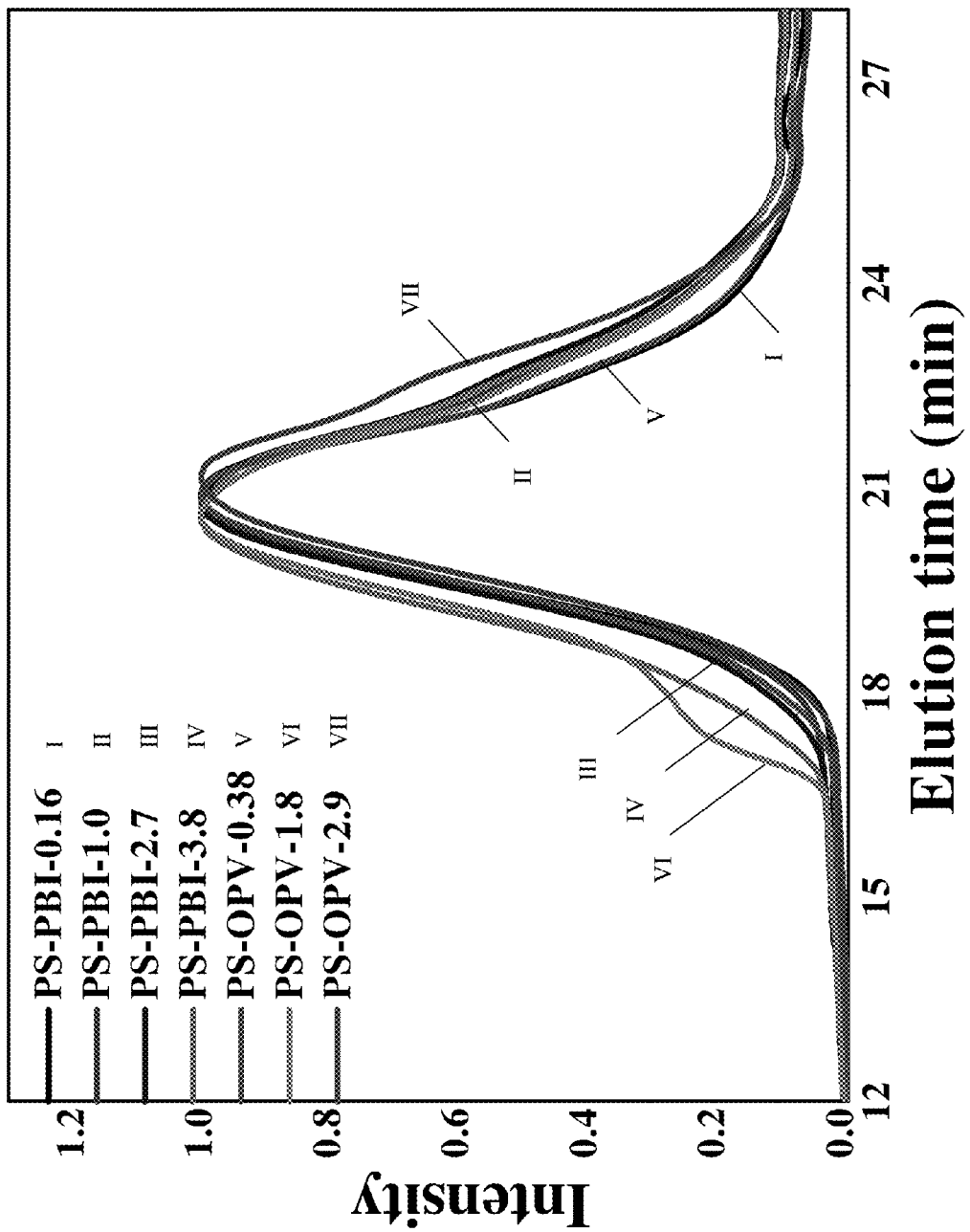

FIG. 12: Depicts size exclusion chromatography of polymers.

Figure 13:
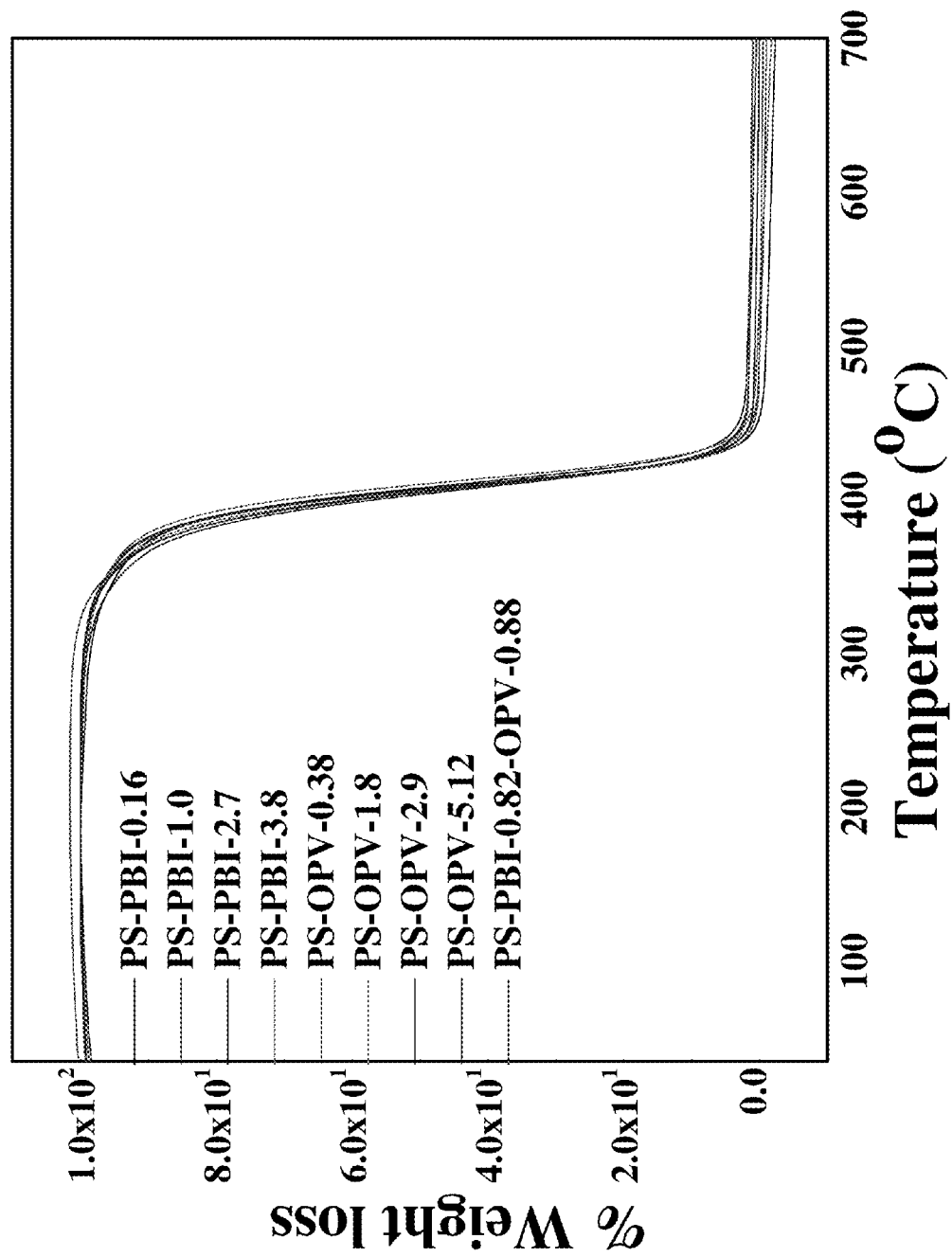

FIG. 13: Depicts thermo gravimetric Analysis (TGA) of all cross linked PS samples.

Figure 14:
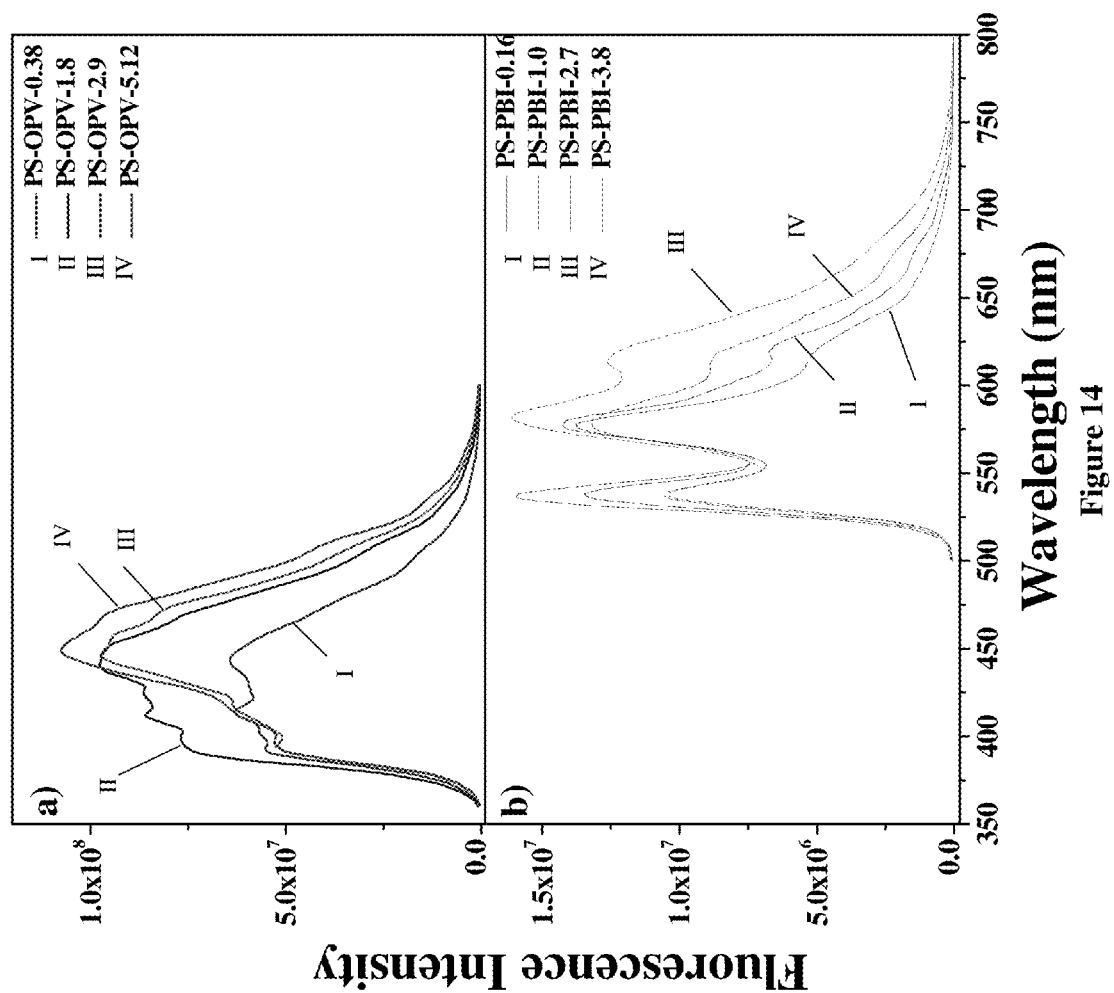

FIG. 14: Depicts solid state (powder) emission spectra of the crosslinked PS polymers upon excitation at 350 nm for a) PS-OPV-X series, and (b) at 490 nm for PS-PBI-X series.

Figure 15:
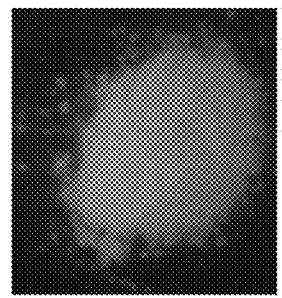
Figure 15:
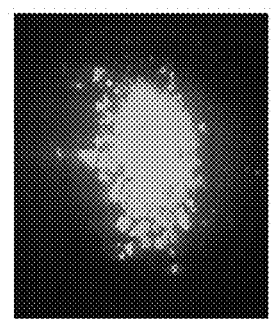
Figure 15:
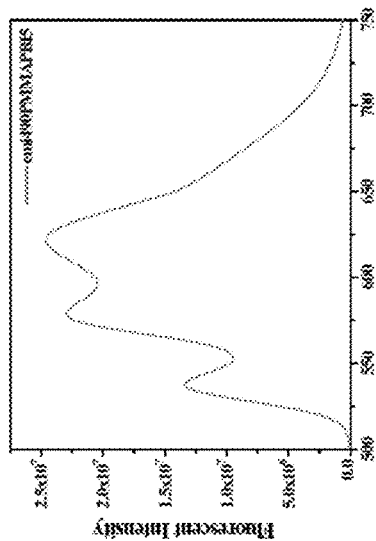
Figure 15:
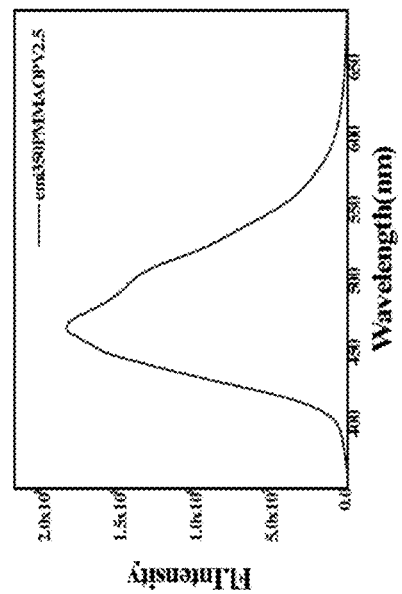
Figure 15:
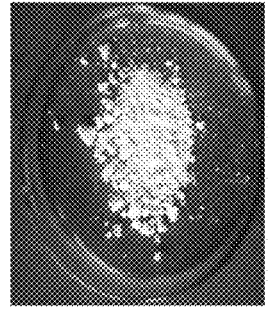

FIG. 15: Depicts solid state emi-490 of PMMA-PBI-5 mg and emi-350 PMMA-OPV 2.5 mg (Powder Form).

Figure 16:
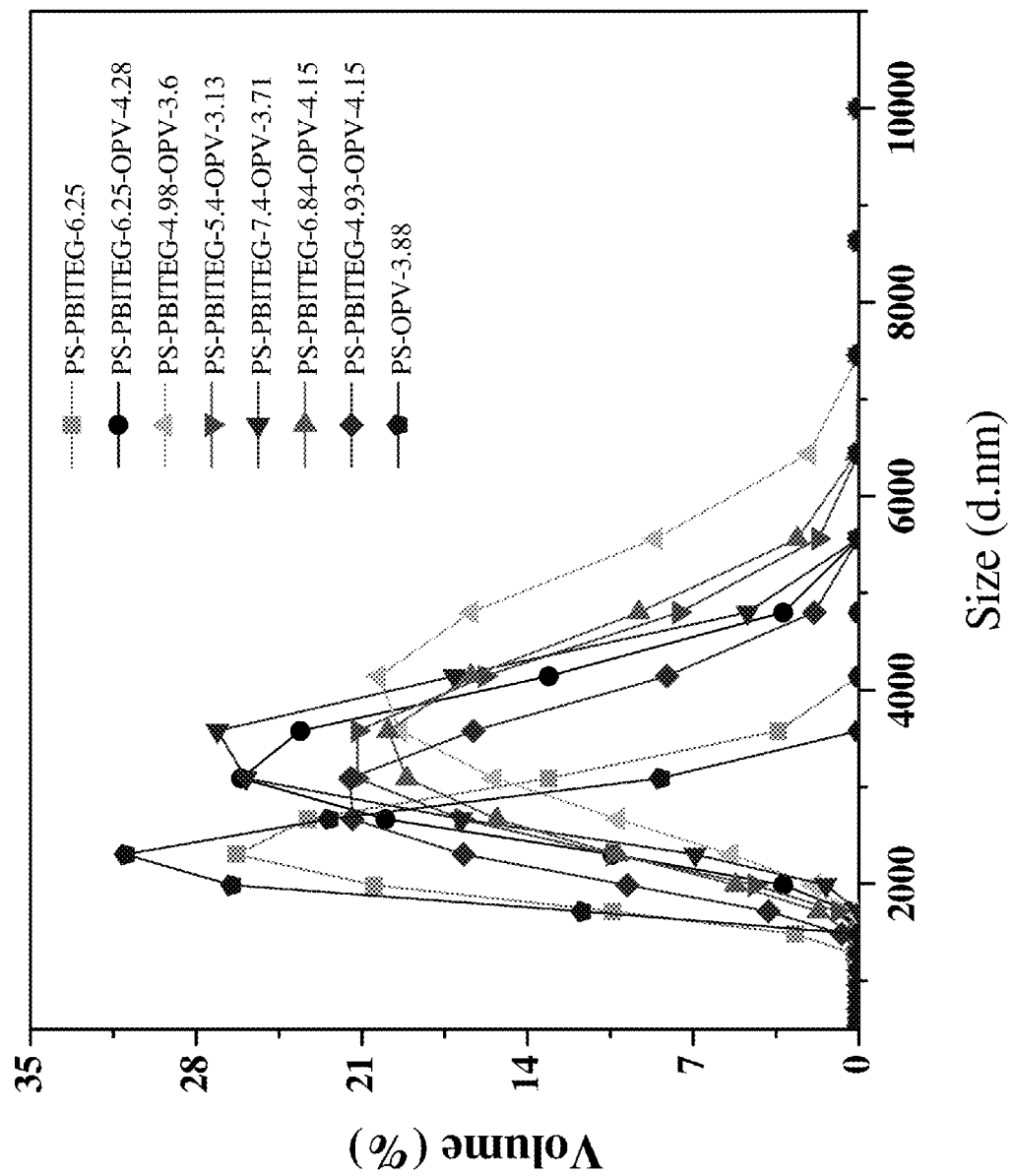

FIG. 16: Volume-average size distribution of PS-PBITEG-OPV-X series in ethanol dispersion obtained by dynamic light scattering (DLS) analysis.

Figure 17:
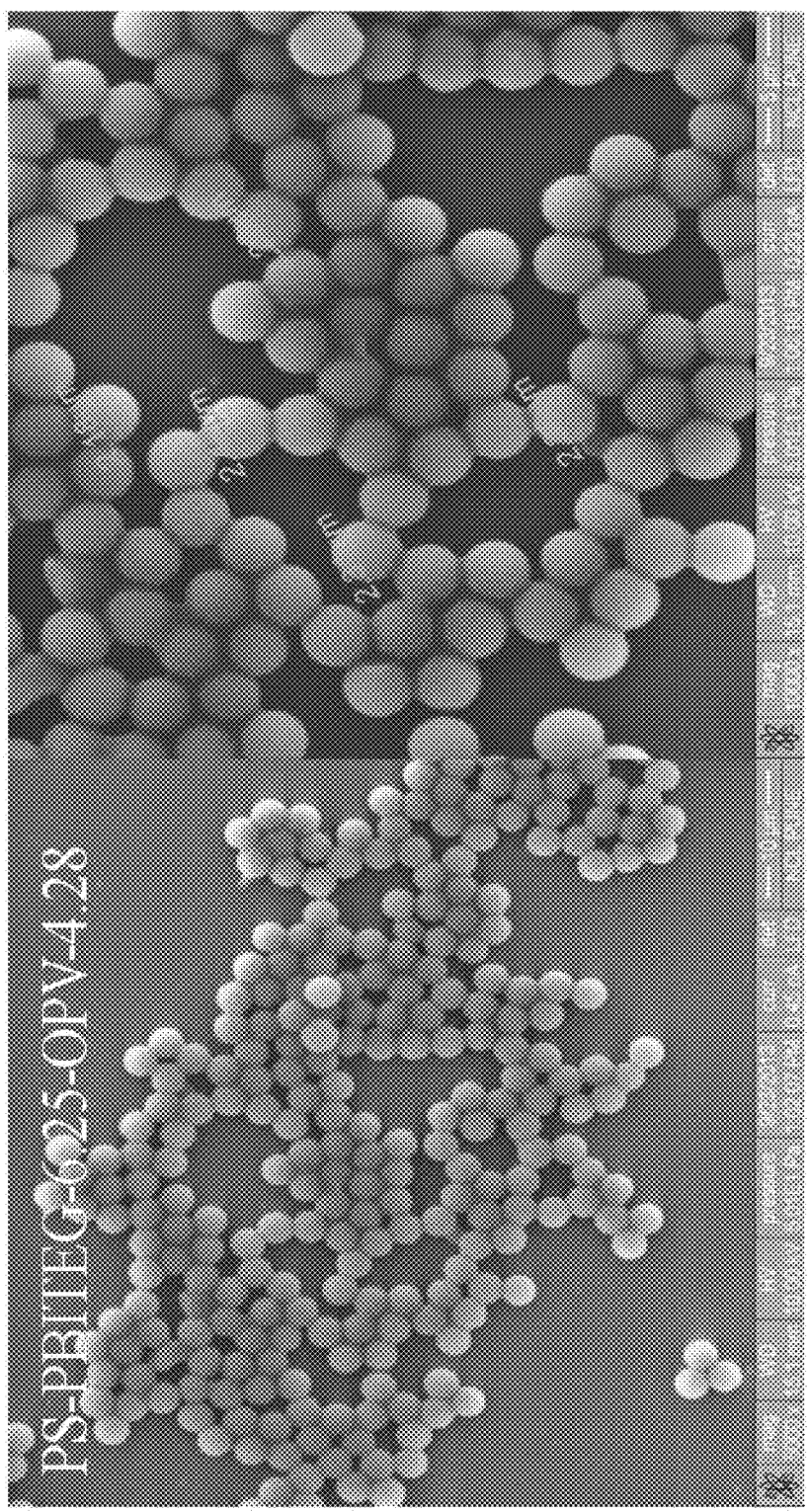

FIG. 17: SEM image of PS-PBITG-6.25-OPV-4.28 drop cast on silicon wafer (1 mg/2 ml ethanol dispersion) drop cast on carbon coated copper grids.

Figure 18:
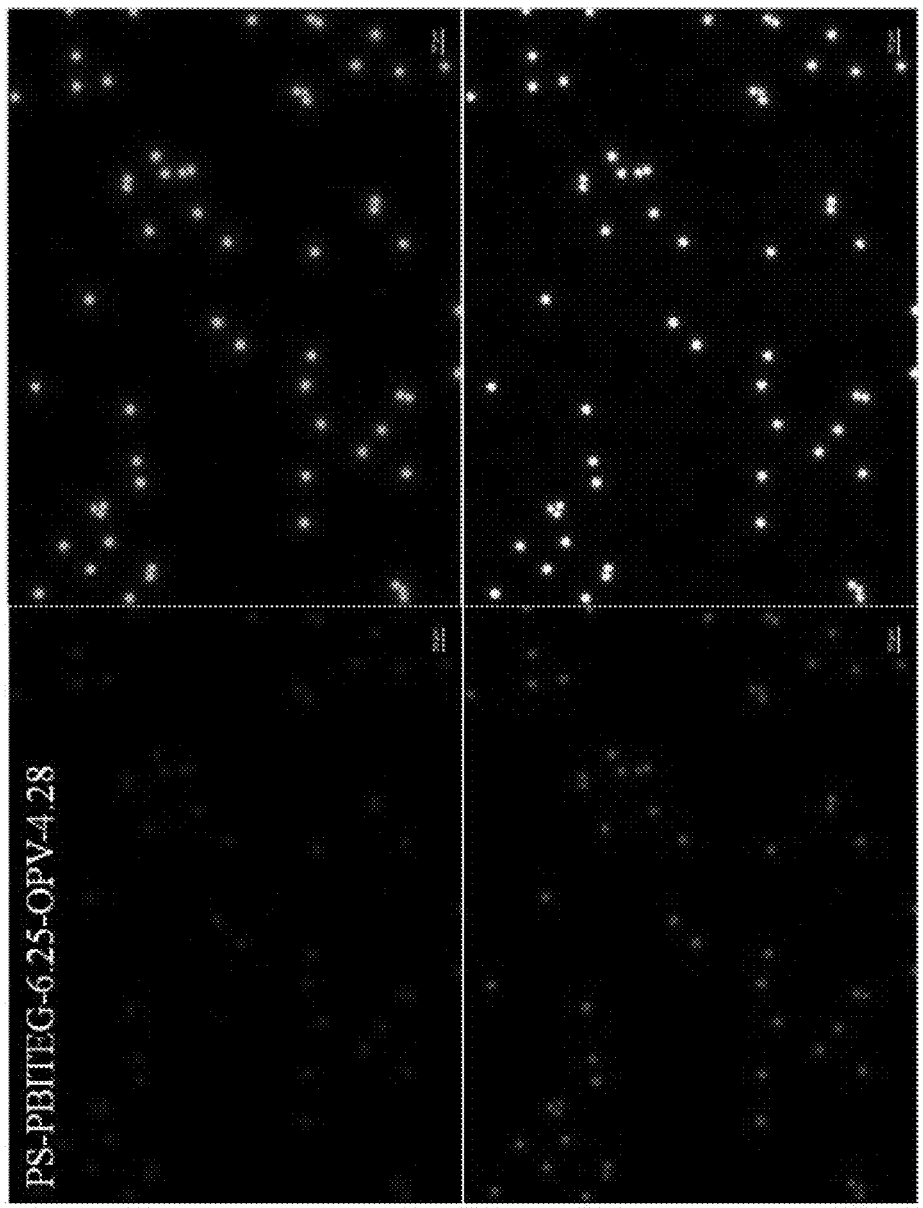

FIG. 18: Fluorescence optical microscopy images of (a) PS-PBITG-6.25-OPV-4.28 using DAPI, Alexa and Rhodamine filters. (350-430 nm Blue, 488-520 Green and 480-580 nm for Red filters and the fourth image is the merge image for the all three blue green and red image).

Figure 19:
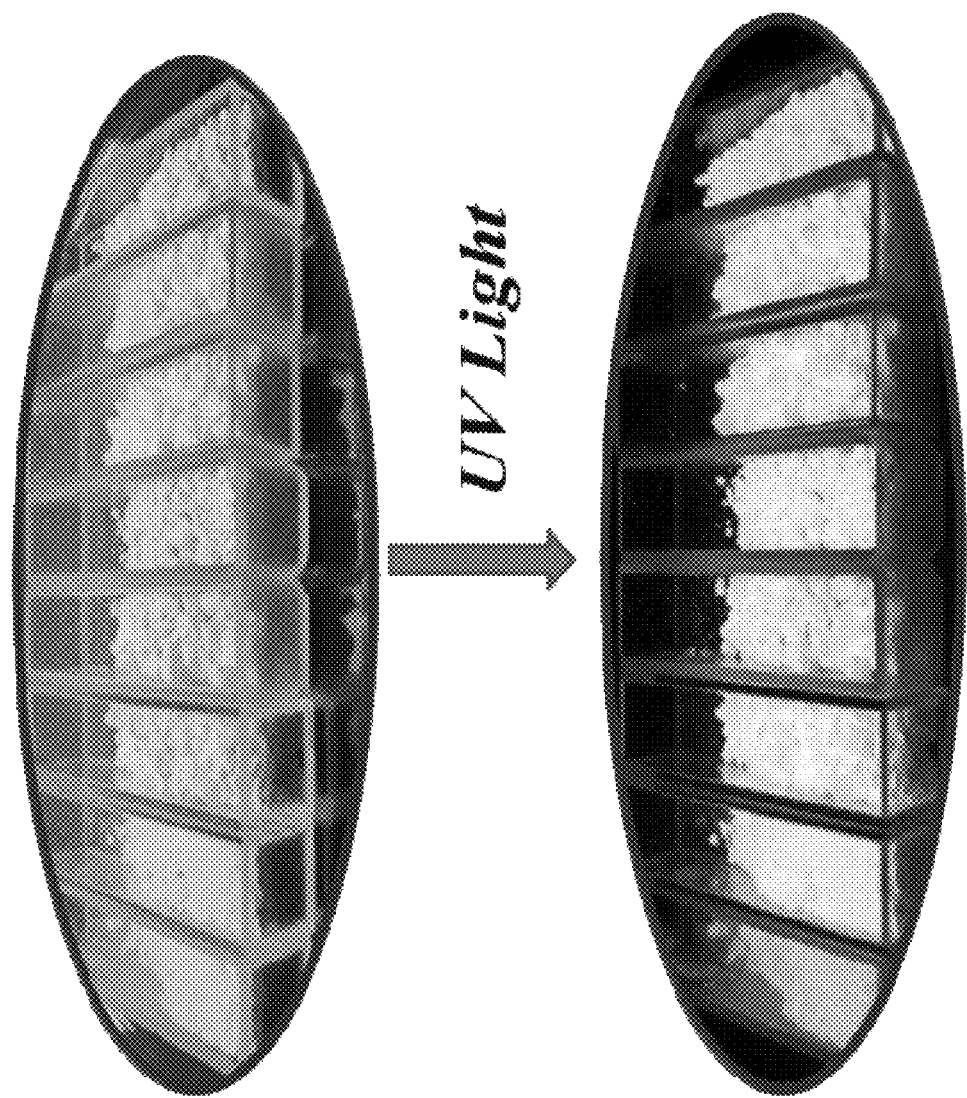

FIG. 19: The images of the powdered of all PS/PBITEG/OPV polymers samples both under (top) normal and (bottom) UV light.

FIG. 20: (a) Emission spectra in the solid state for PS-PBITEG-6.25-OPV-4.28 upon excitation at 350 nm. (Inset the photograph of the white emitting powder under hand-held UV lamp). (b) The corresponding International CIE coordinate diagram (0.33, 0.32).

Figure 21A:
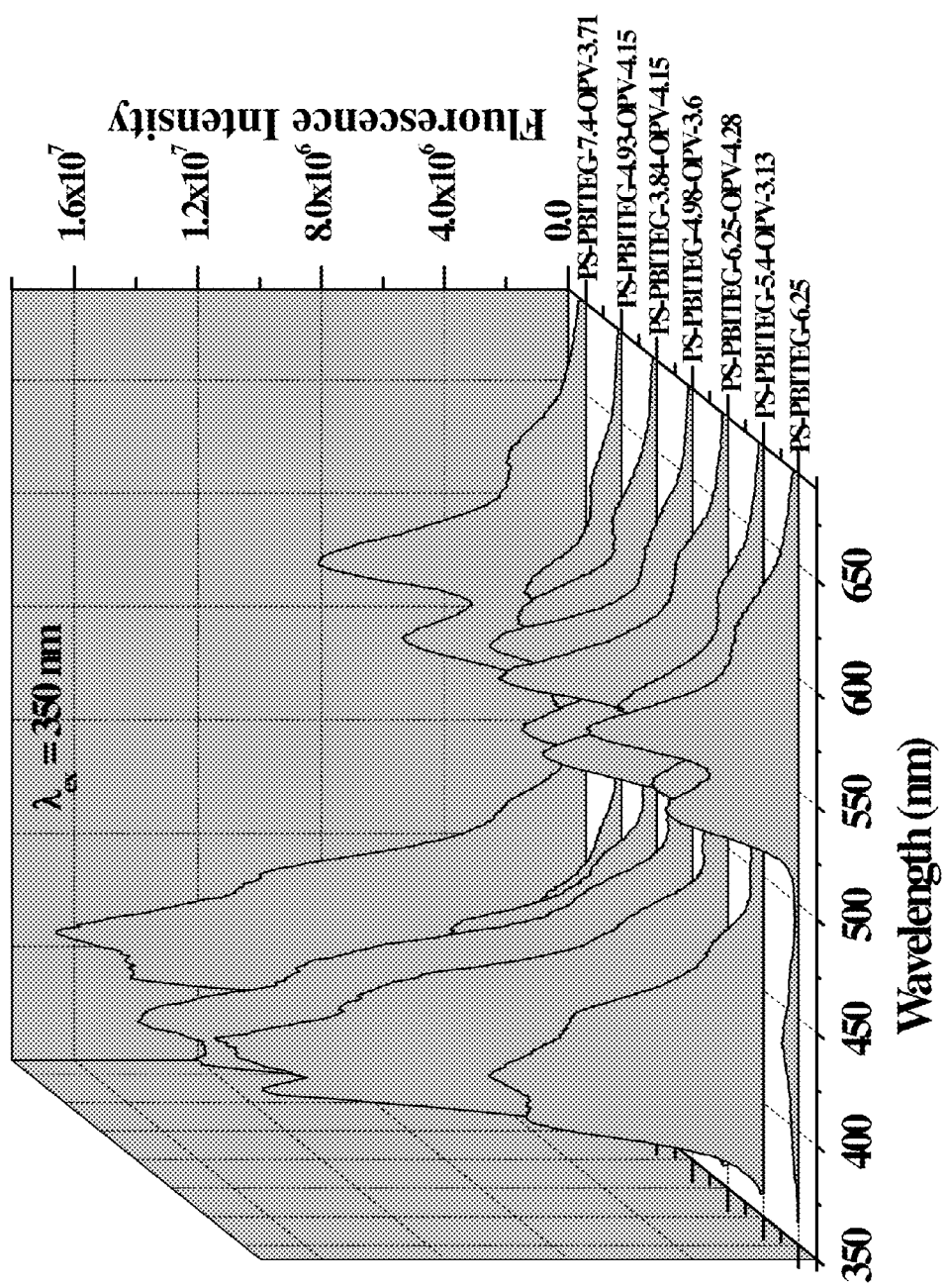
Figure 21B:
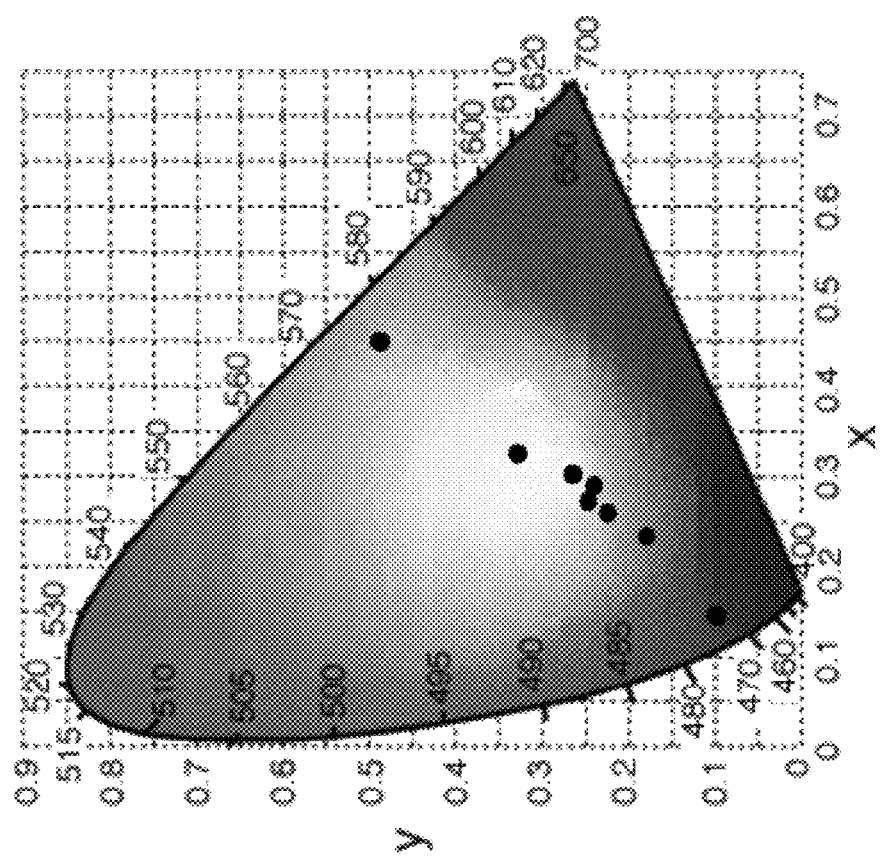

FIG. 21: (a) Solid state (powder) emission spectra of the cross-linked PS polymers upon excitation at 350 nm for PS-PBITEG-OPV series (b) The International CIE coordinate diagram marked with coordinates corresponding to blue (0.15, 0.10) for PS-OPV-3.88, white (0.33, 0.32) for PS-PBITEG-6.25-PS-OPV-3.88 and orange-yellowish (0.45, 0.48) for PS-PBITEG-3.2.

ABBREVIATIONS

OPVX: Oligo (p-phenylenevinylene) based crosslinker
PBIX: Perylene bisimide based crosslinker
PBITEG: Perylene bisimide Tetraethylene Gllycole Diacrylate based crosslinker PS-PBIX: Fluorescent Crosslinked Polystyrene-Perylene bisimide
PS-PBI-X-OPV-X: Fluorescent Crosslinked Polystyrene-Perylene bisimide Oligo (p-phenylenevinylene)
PS-PBITEG-X-OPV-X: Fluorescent Crosslinked Polystyrene-Perylene bisimide Oligo (p-phenylenevinylene)
PS-OPVX: Fluorescent Crosslinked Polystyrene-Oligo (p-phenylenevinylene)
PMMA: Polymethyl methacrylate
PMMA-PBIX: Fluorescent Crosslinked Polymethyl methacrylate-Perylene bisimide
PMMA-OPVX: Fluorescent Crosslinked Polymethyl methacrylate-Polystyrene-Oligo (p-phenylenevinylene)
AIBN: 2,2'-azobis-(isobutyronitrile)
PS: Polystyrene
PBITEGA: Perylene bisimide Tetraethyleneglycolediacrylate

DETAILED DESCRIPTION OF THE INVENTION

The present invention provides fluorescent chromophore monodisperse crosslinked polymer microbeads, where chromophore functions as fluorescence as well as crosslinker, wherein the fluorescence occurs in solid state and solution state, with high quantum yield in solid state.

The composition preferably consisting of fluorescent chromophore, cross-linker, monomer, and other additives, wherein the chromophore functions has dual role of cross linker as well as fluorescent with tuning of emission wavelength.

The organic fluorescent chromophore or fluorophores are chemically, thermally and photochemically stable, having high quantum efficiency selected from the group consisting of functionalized perylene 3,4,9,10-tetracarboxylic diimide also referred as perylene bisimide (PBI) and oligo(p-phenylenevinylene) (OPV) which are made more compatible with the dispersion polymerization recipe by the introduction of flexible groups like tetraethylene glycol or branched alkoxy units.

In one aspect, the invention provides fluorescent, monodisperse, perylene-bisimide (PBI) based and oligo (p-phenylenevinylene) (OPV) based crosslinker incorporated to polystyrene (PS) microbeads, having tunable colour emission.

It is advantageous that new crosslinkers based on perylene 3,4,9,10-tetracarboxylic diimide (PBI) and oligo (p-phenylenevinylene) (OPV) having high quantum efficiency.

The crosslinkers or fluorophores employed in the instant invention are selected from the group consisting of perylene based crosslinkers or oligo (p-phenylenevinylene) based crosslinkers or combination thereof, wherein the perylene based crosslinker is (PBITEGA) or (PBIX) and oligo(p-phenylenevinylene) based crosslinker is (OPVX).

The monomer is selected from the group consisting of styrene, methyl methacrylate preferably the monomer employed in the invention is styrene.

The structure of composite is not limited to microbeads but also includes microspheres, balls, micro particles, nanospheres. The fluorescent spherical crosslinked PS beads having an average diameter of 2-6 μm, preferably 2-3 μm and increases with higher crosslinker incorporation.

In another embodiment the composition comprising polymer beads crosslinked with fluorophore may include PS-PBIX, PS-OPVX, PS-PBITEGA, PS-PBIX-OPVX, PMMA-OPVX, PMMA-PBIX, where PS and PMMA are commercially available polymer and OPVX, PBIX and PBITEGA are high quantum efficiency, crosslinkers. The cross linker alone fluoresces in solution, but with instant polymer it fluoresces in solid state.

In another preferred embodiment, the invention provides process for preparation of the crosslinked monodispersed, thermally stable polymer microbeads by adopting two-stage dispersion polymerization strategy comprises dispersion of additives to the polymer beads followed by dispersion of fluorophore crosslinkers to the same.

Here we report tunable emission colors as well as solid state white light emission with high quantum yield from PS beads containing both blue emitting OPV and red emitting PBI which were covalently incorporated as crosslinkers.

Solid state white light emission was achieved from Polystyrene (PS) microbeads incorporated with fluorophores based on perylene bisimide (PBITEG) and oligo(p-phenylenevinylene) (OPV) as acrylic crosslinkers. The PS beads incorporated with only PBITEG gave intense orange red emission, PS incorporated with OPV exhibited green emission, whereas a series of polymers incorporating both crosslinkers exhibited varying shades of white light emission. One of the PS sample—PS-PBITEG-6.25-OPV-4.28, exhibited pure white light emission in the powder form with CIE coordinates (0.33, 0.32). The rigid aromatic crosslinkers were incorporated into PS backbone in a two-stage dispersion polymerization to afford PS beads in the size range 2-3 μm. The incorporation of fluorophores as crosslinkers enabled covalent attachment of the dye to the polymer backbone avoiding dye leakage, besides avoiding aggregation induced fluorescence quenching.

The process comprises two-stage dispersion polymerization, wherein first stage comprises dispersion of additives to the polymer and second stage includes fluorophore crosslinkers uniformly dispersed over the polymer beads/spheres.

The incorporation of fluorescent chromophore into commercially available polymer like that of polystyrene, where chromophore also functions as cross linker with fine tuning of emission wavelength. The fluorescent chromophore or fluorophore is covalently attached to polymer backbone.

In the instant methodology less as $10^{-7}$ moles of the fluorophore as the crosslinker is sufficient to obtain highly fluorescent polystyrene beads which gives high emission in the solid powder state is in the range of ($\phi_{powder}$) (0.25% 0.71%). The amount of cross linker is ranges from 5-20 mg or 3.4 to 14 μM or 0.13 to 0.51 wt % w.r.t. monomer, which are incorporated by dispersion polymerization to obtain a series of lightly crosslinked polymer.

The process of the invention is an easy and scalable towards thermally stable fluorescent monodisperse crosslinked polymer beads, where the fluorophore is covalently incorporated in the polymer backbone. When chromophore is incorporated more, quenching may occur, but in the instant composition it is well separated to retain or enhance fluorescence. These polymer beads are strongly emitting in the solid state also and have tunable emission colors.

The invention provides synthesis of fluorescent crosslinker perylenebisimide (PBIX), oligo (p-phenylenevinylene) (OPVX) and Perylene bisimide Tetraethyleneglycole-diacrylate (PBITEGX) as shown in scheme 1, 2 and 3 respectively.

Accordingly, the synthesis for preparation of perylene based crosslinker PBIX, starts with imidization of perylenetetracarboxylic anhydride with 4-amino-3-pentadecyl phenol to obtain compound (3), further treatment with TEG-Monotosylate in presence of $K_2CO_3$ gives compound (4) that subsequently coupled with acryloyl chloride, in presence of base $Et_3N$ yields PBIX (1). (Scheme 1).

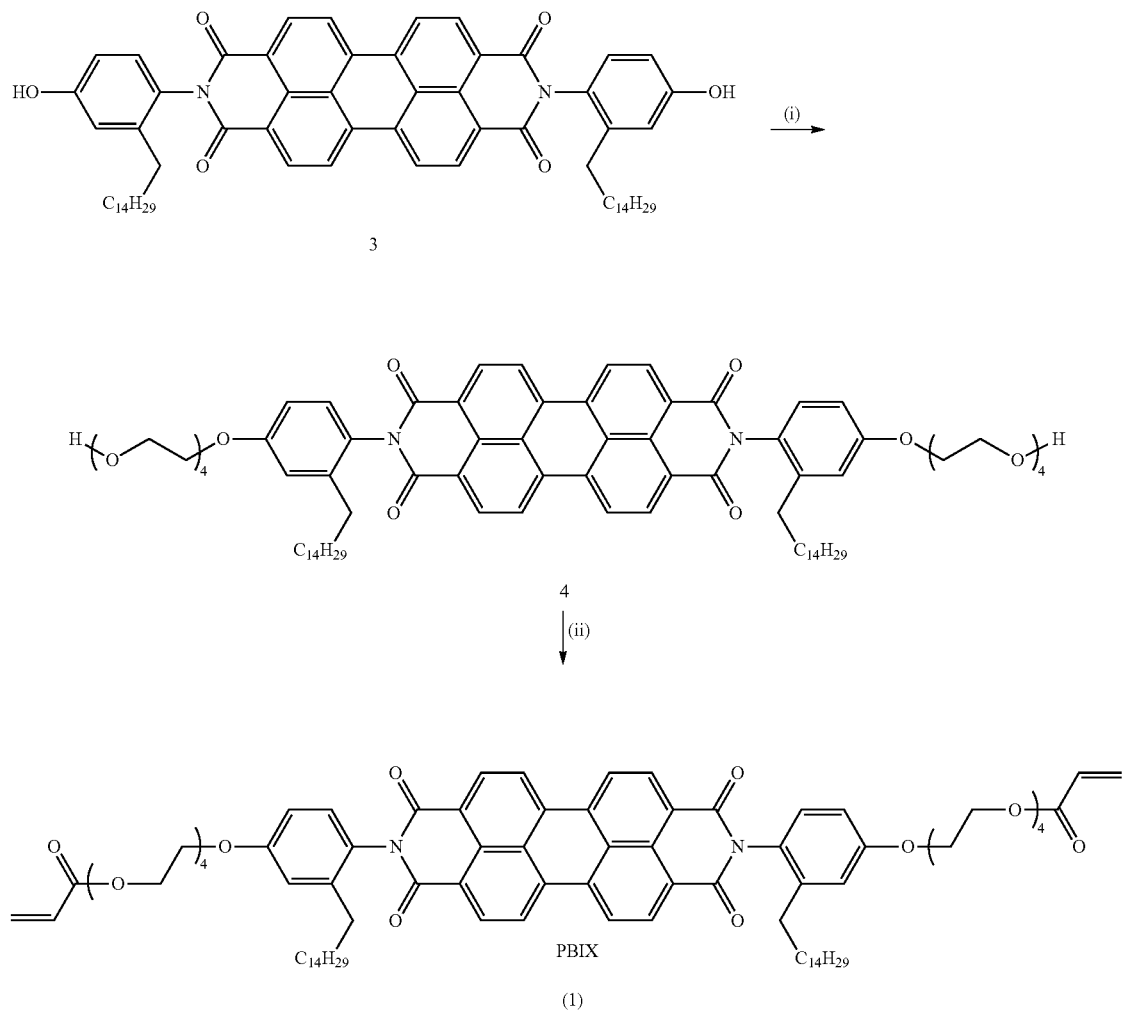
Similarly, synthesis of OPVX crosslinker, comprises wittig reaction of aldehyde (5) with phosphate ester (6) in presence of potassium t-butoxide gives hydroxyl functionalized OPV molecule (7), which is then coupled with acryloyl chloride in suitable condition to obtain the OPVX crosslinker (2). Scheme-2 and 3).
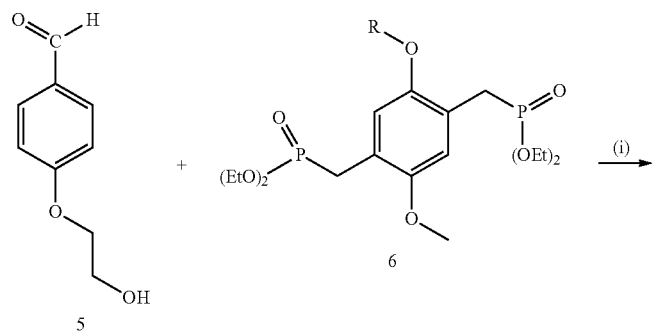

-continued

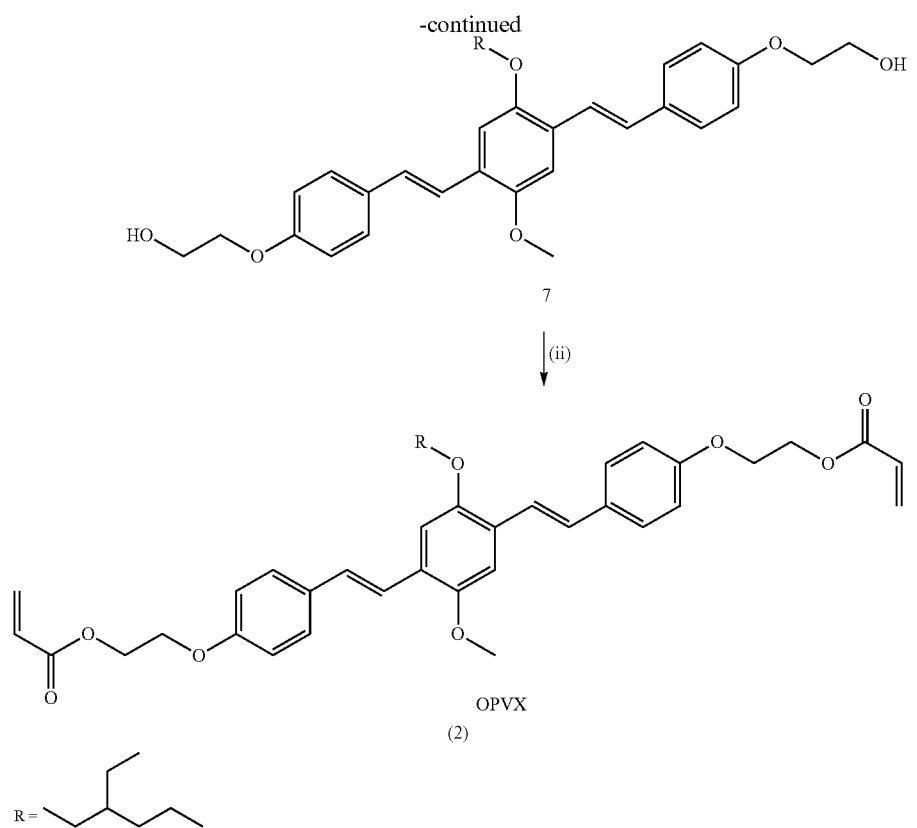

SCHEME 3

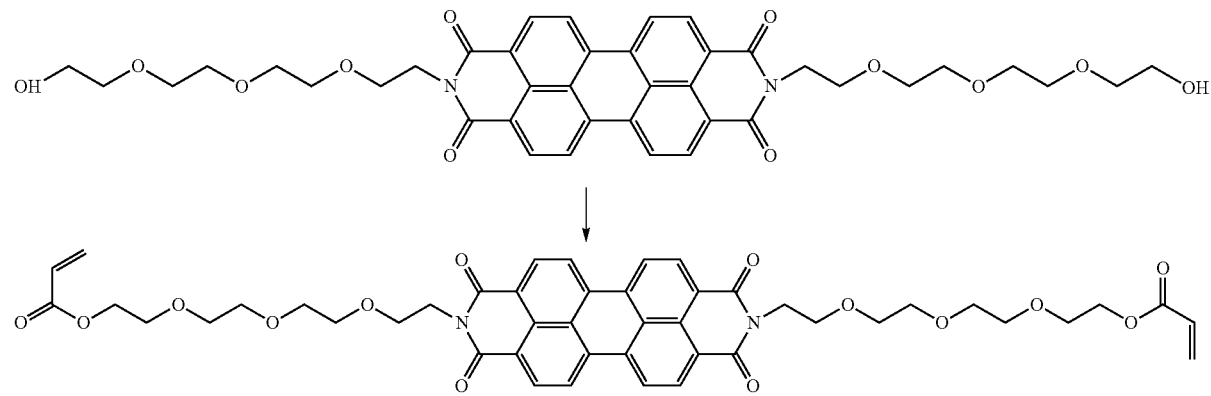

The composition of the invention comprises monomer, cross linker and other additives. The additives are selected from the group consisting of solvent medium, stabilizer, co-stabilizer, surfactant, initiator and like thereof, preferably solvent medium is selected from methanol, DCM, ethanol; stabilizer is polyvinylpyrrolidone (PVP), co-stabilizer is non-ionic surfactant such as t-octylphenoxypolyethoxyethanol (triton X-100), and initiator azobisisobutyronitrile (AIBN) respectively. The first stage dispersion to polymerise the monomer is essentially carried out in presence of medium, stabilizer, co-stabilizer, initiator, followed by second stage dispersion of cross-linkers to polymer beads optionally in presence of additives, to obtain uniformly distributed, highly fluorescent, monodisperse, cross-linked polymer microbeads.

The reaction time for the dispersion polymerization is ranges from 7-10 hrs, preferably 8 hrs and rotation speed for the dispersion is in the range of 100-150 rpm, particularly 120 rpm for uniform distribution of fluorophores.

Further the synthesized fluorescent polymer microbeads are useful in various biological, medical applications such as incorporating in cell.

The fluorescent polystyrene beads were analyzed using microscopic techniques like fluorescence microscopy, scanning electron microscopy (SEM) and transmission electron microscopy (TEM). Photophysical characterization was carried out using absorption and fluorescence spectroscopic techniques.

Characterization of Cross-Linkers

The structure and purity of the crosslinkers were confirmed by $^1$H NMR, (FIGS. 9 to 11). The two-stage dispersion polymerization recipe to incorporate the fluorescent crosslinkers PBIX, OPVX and PBITEGA with OPVX into PS backbone is given in Table 1.

TABLE 1

Dispersion Polymerization Recipe:

| Component | Material | Amount (gm) 1$^{st}$ Stage | Amount (gm) 2$^{nd}$ Stage |
|---|---|---|---|
| Monomer | Styrene | 1.89 | 1.89 gm |
| Crosslinker | PBI/OPV | No | 2.5 to 20 |
| Crosslinker | PBITEG/OPV | No | 2.4 to 3.6 |
| Solvent/Medium | Ethanol | 7.4 | 7.4 |
| Stabilizer | PVP | 0.25 | No |
| Co-Stabilizer | Triton X-100 | 0.08 | No |
| Initiator | AIBN | 0.060 | No |
| Reaction time | 8 hours | — | — |
| Rotation Speed | 120 rpm | — | — |

Varying amounts of the crosslinker (5-20 mg; 3.4 to 14 µM) (0.13 to 0.51 wt % w.r.t. styrene) were taken in the feed to obtain a series of lightly crosslinked polystyrene. One crosslinked PS was synthesized using both PBIX and OPVX~3.0×10$^{-6}$ mols each. The highest amount of the crosslinker that could be added in the feed during the second stage without the dispersion crashing out was 14 µM. The actual incorporation of the PBI as well as OPV based crosslinker into the PS backbone was determined using Beer-Lamberts Law using the molar extinction coefficient of the respective crosslinker (PBIX=62082 L·M$^{-1}$·cm$^{-1}$, OPVX=36315 L·M$^{-1}$·cm$^{-1}$). The crosslinked PS with PBIX and OPVX were named as the PS-PBI-X and PS-OPV-X series respectively, where '-X' indicated the amount (in µM) of the respective crosslinker incorporated. And fluorescent crosslinkers PBITEG and OPV into PS backbone is also given in Table-1. Varying amounts of the crosslinker (4.9 to 6.25 for PBITEG and 3.13 to 4.2 for OPV in M) (0.13 to 0.51 wt % w.r.t. styrene) were taken in the feed to obtain a series of lightly crosslinked polystyrene microbeads. A PS samples with single chromophore PBITEG was also developed. The crosslinked PS with PBITEG and OPV were named as the PS-PBITEG-x-OPV-x, where 'x' indicated the amount (in µM) of the respective crosslinker incorporated. The actual incorporation of the chromophore in the polystyrene backbone was calculated by Beer-Lamberts Law using the molar extinction coefficient of the respective crosslinker (PBITEG=80,600 LM$^{-1}$ cm$^{-1}$).

Further Table-2 gives the fluorophore incorporation determined from UV-Vis studies. The PS remained completely soluble for the highest crosslinker incorporation also (~5 µM). The complete solubility of these lightly crosslinked polystyrene in common organic solvents enabled the structural characterization using proton NMR spectroscopy, UV-Vis absorption spectroscopy as well as molecular weight determination using size exclusion chromatogram (SEC). The molecular weight of the crosslinked PS was determined by SEC using chloroform as the eluent. The GPC chromatogram is given in the FIG. 12. Higher incorporation of the rigid crosslinker resulted in considerable reduction in the $M_w$ values especially in the case of PS-OPV-X polymers. Table-2a gives the molecular weight determined by SEC along with that of PS alone prepared under identical conditions.

TABLE 2a

Sample designation, Number and Weight Average Molar Mass, Polydispersity indices (PDI), Yield and 5 wt % loss Temperature of the PS/PBI/OPV based polymers.

| Sr No | Sample Name | Moles in feed | Moles of Cross linker incorporation from UV$^a$ | Yield (%) | $M_n^b$ | $M_W^b$ | PDI | TGA$^c$ ($T_d$ = 5%) |
|---|---|---|---|---|---|---|---|---|
| 1 | PS-PBI-0.16 | 3.4 × 10$^{-6}$ | 1.6 × 10$^{-7}$ | 80 | 40,000 | 99,900 | 2.5 | 345 |
| 2 | PS-PBI-1.0 | 6.8 × 10$^{-6}$ | 1 × 10$^{-6}$ | 78 | 24,800 | 91,600 | 3.7 | 345 |
| 3 | PS-PBI-2.7 | 1 × 10$^{-5}$ | 2.7 × 10$^{-6}$ | 76 | 37,900 | 154,000 | 4.0 | 345 |
| 4 | PS-PBI-3.8 | 1.4 × 10$^{-5}$ | 3.8 × 10$^{-6}$ | 75 | 32,400 | 149,000 | 4.6 | 345 |
| 5 | PS-OPV-0.38 | 3.7 × 10$^{-6}$ | 3.8 × 10$^{-7}$ | 80 | 24,900 | 99,000 | 4 | 340 |
| 6 | PS-OPV-1.8 | 7.5 × 10$^{-6}$ | 1.8 × 10$^{-6}$ | 82 | 34,700 | 18,0000 | 5.1 | 340 |
| 7 | PS-OPV-2.9 | 1.5 × 10$^{-5}$ | 2.9 × 10$^{-6}$ | 86 | 17,600 | 670,000 | 4.4 | 340 |
| 8 | PS-OPV-5.12 | 2.2 × 10$^{-5}$ | 5.12 × 10$^{-6}$ | 85 | 19,400 | 63,000 | 3.5 | 340 |
| 9 | PS-PBI-0.82-OPV-0.88 | 3.4 × 10$^{-6}$ 3.7 × 10$^{-6}$ | 8.2 × 10$^{-7}$ 8.8 × 10$^{-7}$ | 80 | 21,000 | 78,300 | 3.7 | 340 |
| 10 | PS | — | — | 90 | 40,200 | 1,24,800 | 3.10 | 320 |
| 11 | PS-DVB | — | — | 78 (Insoluble) | — | — | — | 340 |

$^a$Measured in chloroform
$^b$Measured by size exclusion chromatography (SEC) in chloroform (CHCl$_3$), calibrated with linear, narrow molecular weight distribution polystyrene standards.
$^c$TGA measurements at heating rate of 10° C./min under nitrogen.

Table-2b gives the molecular weight determined by SEC along with that of PS alone prepared under identical conditions. The thermal stability of the crosslinked polymers was determined by thermogravimetric analysis (TGA) carried out under nitrogen atmosphere and the 5 wt % loss was observed at 324-345° C.

TABLE 2b

Sample designation, Number and Weight Average Molar Mass, Polydispersity indices (PDI), Yield and 5 wt % loss Temperature of the PS/PBITEG/OPV based polymers.

| Sample Name | Moles in feed (10$^{-6}$) | Moles Incorporated[a] (10$^{-7}$) | Yield (%) | $M_n$[b] | $M_W$[b] | PDI[a] | TGA[c] ($T_d$ = 5%) |
|---|---|---|---|---|---|---|---|
| PS-PBITEG-6.25 | 3.7 | 6.25 | 93 | 45,900 | 96,800 | 2.1 | 345 |
| PS-PBITEG-6.25-OPV-4.28 | 3.7 | 6.25 4.28 | 81 | 34,600 | 123,200 | 3.5 | 345 |
| PS-PBITEG-4.98-OPV-3.6 | 3.7 4.3 | 4.98 3.6 | 90 | 28,500 | 101,700 | 3.5 | 345 |
| PS-PBITEG-5.4-OPV-3.13 | 3.7 3.14 | 5.45 3.13 | 92 | 23,000 | 64,400 | 2.8 | 345 |
| PS-PBITEG-7.4-OPV-3.71 | 4.3 3.7 | 7.4 3.71 | 81 | 27,300 | 115,900 | 4.2 | 345 |
| PS-PBITEG-4.93-OPV-4.15 | 3.3 3.7 | 4.93 4.15 | 92 | 20,200 | 64,700 | 3.2 | 345 |
| PS-PBITEG-3.84-OPV-4.15 | 2.8 3.7 | 3.84 4.15 | 86 | 27,900 | 94,800 | 3.4 | 345 |
| PS-OPV-3.88 | 3.7 | 3.88 | 80 | 24,900 | 99,000 | 4 | 340 |

[a]Measured in chloroform
[b]Measured by size exclusion chromatography (SEC) in chloroform (CHCl$_3$), calibrated with linear, narrow molecular weight distribution polystyrene standards.
[c]TGA measurements at heating rate of 10° C./ min under nitrogen.

Crosslinking is known to improve the thermal stability of the polymers; the PS-PBI/OPV-X series of crosslinked polymers had higher thermal stability compared to uncrosslinked PS as determined by the thermogravimetric analysis. PS had a 5 weight % loss at 320° C., while the PS-PBI/OPV-X crosslinked polymers exhibited 5 weight % loss at a much higher temperature of 340-345° C. A 3 mol % divinylbenzene (DVB) crosslinked PS prepared by the two stage dispersion polymerization under identical conditions also exhibited a 5 weight % loss temperature of 340° C. Table 2a lists the 5 weight % loss temperature and FIG. 13 gives the TGA plot for first series of polymers.

The photoluminescence quantum yield of the fluorescent crosslinker polymer in solid and solution state is depicted in Table 3.

TABLE 3a

Photoluminescence quantum yield measured as powder and in CHCl$_3$ solution.

| Sr No. | Polymer | CHCl$_3$ $\lambda_{ex}$ (nm) | ϕ | Powder $\lambda_{ex}$ (nm) | ϕ |
|---|---|---|---|---|---|
| 1 | PBIX | 490 | 0.27 | 490 | 0.055 |
| 2 | OPVX | 350 | 0.88 | 350 | 0.037 |
| 3 | PS-PBI-0.16 | 490 | 0.33 | 490 | 0.25 |
| 4 | PS-OPV-0.38 | 350 | 0.66 | 350 | 0.71 |
| 5 | PS-PBI-0.82-OPV-0.88 | 490 | 0.34 | 490 | 0.33 (PBI) |
|   |   | 350 | 0.57 | 350 | 0.20 (OPV) |

The PS beads incorporating PBI exhibited intense orange red emission in the solid state with quantum yield $\phi_{Powder}$=0.25, while the PS incorporating OPV as the crosslinker fluorophore exhibited intense green emission very high quantum yield of $\phi_{Powder}$=0.71.

TABLE 3b

Photoluminescence quantum yield measured as powder and in CHCl$_3$ solution.

| Sample Name | Solid State Quantum Yield (ϕ) $\lambda_{ex=350\ nm}$ | Solid State Quantum Yield (ϕ) $\lambda_{ex=490\ nm}$ | CIE Color Co-Ordinate X | CIE Color Co-Ordinate Y |
|---|---|---|---|---|
| OPV-Cross-linker | 0.02 | — | — | — |
| PBITEG-Cross-linker | — | 0.06 | — | — |
| PS-OPV-3.88 | 0.72 | — | 0.45 | 0.48 |
| PS-PBITEG-6.25 | — | 0.21 | 0.15 | 0.1 |
| PS-PBITEG-5.4-OPV-3.13 | 0.22[a] | 0.23[b] | 0.30 | 0.26 |
| PS-PBITEG-6.25-OPV-4.28 | 0.13[a] | 0.23[b] | 0.33 | 0.32 |
| PS-PBITEG-4.98-OPV-3.6 | 0.27[a] | 0.25[b] | 0.29 | 0.24 |
| PS-PBITEG-3.84-OPV-4.15 | 0.28[a] | 0.26[b] | 0.26 | 0.22 |
| PS-PBITEG-4.93-OPV-4.15 | 0.26[a] | 0.25[b] | 0.28 | 0.24 |
| PS-PBITEG-7.4-OPV-3.71 | 0.18[a] | 0.21[b] | 0.30 | 0.26 |
| PS-PBITEG-6.25 + PS-OPV-3.88 (Physical Mix) (1:1) | — | — | 0.24 | 0.18 |

It can be seen from table 3b that the quantum yield for PBITEG emission was not much affected by the presence of the OPV chromophore, whereas considerable reduction was observed in the OPV emission when PBI was also incorporated into the PS backbone. In order to understand the reason for the reduction in the OPV emission quantum yield, a physical mixture of the two PS polymers having single chromophore incorporation was studied. Thus, a 1:1 molar mixture of the two polymers PS-OPV-3.88 and PS-PBITEG-6.25 was made and its solid state emission spectra was compared with that of the polymer having similar molar (covalent) incorporation of both the chromophores i.e PS-PBITEG-6.25-OPV-4.28.

Microscopic Characterization

The dispersity of the crosslinked PS particles was determined using dynamic light scattering (DLS) studies carried out in ethanol dispersion. The samples showed an average particle size of 2-3 μm with increasing size for higher crosslinker incorporation. FIG. 1 shows the DLS curves for PS-PBI-X and PS-OPV-X series which clearly indicated narrower particle size distribution for low incorporation of crosslinker. The SEM images also supported the narrow particle size distribution. FIG. 2 shows the SEM and TEM images for PS-PBI-0.16. In both cases the spherical particles were monodisperse with an average diameter of 2.0 µm. Similarly, FIG. 3 shows the SEM and TEM images for PS-OPV-0.38 showing the monodisperse nature of particle with average size ~2.6 µm. Fluorescence microscope images of ethanol dispersion of samples drop cast on glass substrate demonstrated the emission from the fluorescent crosslinked PS. FIG. 4 (top) images show the emission of PS-PBI-0.16 beads while the (bottom) images correspond to those for PS-OPV-0.38. The average particle size observed from the fluorescence images were ~1.7 µm for PS-PBI-0.16 and ~1.4 µm for PS-OPV-0.38 respectively. This was in accordance with the sizes observed from SEM and TEM images of the samples indicating their monodispersity. FIG. 20 shows the fluorescence microscope image of the PS-PBI-X and PS-OPV-X series respectively. FIG. 5 shows the SEM (top) and fluorescence microscope images (bottom) for the PS-PBI-0.82-OPV-0.88 sample. The particle size obtained from SEM images was slightly higher (~4 µm) than that of the crosslinked PS particles incorporating either PBI or OPV alone. The dual emission from the sample was clearly observable from the fluorescence images (FIG. 5 bottom) upon using the green and red filter for OPV and PBI emission respectively. The green filter (transparent in the range 488-520 nm) allowed for some of the PBI emission also to filter through, resulting in the yellow-green emission of the particles in contrast to the green emission from the PS-OPV-0.38 sample.

For white light emitting polymers, the particle size dispersity of the crosslinked PS beads was determined using dynamic light scattering (DLS) studies carried out in ethanol dispersion. The single chromophore incorporated PS-OPV-3.88 and PS-PBITEG-6.25 samples showed similar average particle size of 2.3 µm, while the PS beads with both chromophores exhibited slightly higher size distribution of 3.0 to 4.0 µm. FIG. 16 shows the DLS plots for all the polymers. FIG. 17 shows the SEM images of ethanol dispersed samples of PS-PBITEG-6.25-OPV-4.28 on glass substrate. It was clear that the particle size distribution observed in the SEM images was approximately similar to that obtained from DLS. FIG. 18 shows the fluorescence microscope images of ethanol dispersed samples of PS-PBITEGA-6.25-OPVA-4.28 on glass substrate using DAPI (350-430 nm Blue), Alexa (488-520 Green) and Rhodamine (500-550 nm Red) filters. The merged image shows white light emission from the PS beads. The fluorescence microscope images also confirmed the size of the PS beads to be ~2.6 µm, consistent with the DLS and SEM observation.

Photophysical Characterization

The photophysical characteristics of the fluorescent crosslinked PS beads were determined by recording the absorption and emission spectra of 0.1 OD (at the absorption wavelength maxima) solution in chloroform. FIG. 6 compares the normalized (at peak maxima) absorption and emission spectra of the crosslinkers PBIX and OPVX respectively. The absorption spectra of PBIX exhibited peaks in the range of 400-530 nm, corresponding to the $S_0$-$S_1$ transition with well resolved vibronic structure from 0-0, 0-1, 0-2, and 0-3 transitions respectively. The emission spectrum had emission wavelength maxima at 535 nm. The OPVX had absorption maxima at 390 nm and emission wavelength maxima at 430 nm. The fluorescence quantum yields of the two crosslinkers were determined by the relative method using rhodamine-6G in ethanol as a standard for PBI ($\lambda_{ex}$: 490 nm) and quinine sulphate solution in 0.5 M $H_2SO_4$ solution as the standard for OPV ($\lambda_{ex}$: 370 nm). The values were $\phi_{PBI}$=0.27 and $\phi_{OPV}$=0.88 for PBIX and OPVX respectively. The absorption and emission spectra were recorded for the PS-PBI-X and PS-OPV-X series in chloroform.

FIG. 7 compares the normalized emission spectra of the crosslinkers and polymers recorded in the powder form with the corresponding spectra recorded in chloroform solution. The crosslinkers exhibited very weak emission in the solid state. FIG. 7a compares the spectra for the crosslinker OPVX upon excitation at 350 nm. The spectra in the solid state was red shifted by 46 nm (peak maxima at 490 nm) compared to that in solution indicating aggregation in the solid state. FIG. 7b compares the emission spectra of PS-OPV-0.38 recorded in powder form and in solution. In contrast to the red shift observed for the crosslinker, no red shift was observed for the emission of PS-OPV-0.38 in the solid compared to that in solution. The emission in the solid state had a maxima centered ~400 nm with vibrational fine structure. The vibronic structure indicated absence of pronounced molecular interactions among the OPV chromophores distributed in the PS backbone in the solid state. As observed in the solution state, a blue shift of 45 nm was observed in the solid state emission spectra of the PS-OPV-0.38 compared to OPVX. FIG. 7c compares the solid and solution state emission spectra for PBIX. The solid state emission from PBIX was characterized by red shifted emission from aggregates ~660 nm, which was absent in the solution state of the same sample. In the case of the crosslinked PS containing PBI i.e. PS-PBI-0.16 (FIG. 7d), the emission in the solid state was characterized by the higher intensity of the (0,1) vibrational transition compared to the (0,0) transition and a complete absence of aggregate emission >600 nm. The solid state fluorescence quantum yield $\phi_{powder}$ was determined using an integrating-sphere Quanta φ Horiba attachment under excitation at 490 nm for PBI and 350 nm for OPV respectively. PBIX had low solid state quantum yield $\phi_{powder}$ of ~0.055; whereas PS-PBI-0.16 had a high quantum yield $\phi_{powder}$ of ~0.25. The $\phi_{powder}$ of OPVX was very low ~0.037 compared to that of PS-OPV-0.38, which had $\phi_{powder}$ ~0.71. FIG. 25 compares the emission spectra of the crosslinked PS series of polymers in the powder form. The crosslinked PS with higher incorporation of OPV; namely PS-OPV-1.8, PS-OPV-2.9 and PS-OPV-5.12 exhibited fluorescence with the PL intensity increasing with gradual red shift of peak maxima. In the case of the crosslinked PS containing PBI, no aggregate emission beyond 600 nm was observed. FIG. 8 compares the emission spectra of the crosslinked PS bead containing both PBI and OPV, viz; PS-PBI-0.82-OPV-0.88. It exhibited reduced emission intensity for OPV upon excitation at the OPV absorption wavelength maxima of 350 nm. Emission from the PBI in the range >500 nm was also observed upon excitation at 350 nm. Since molecular interactions among the chromophores were expected to be absent or negligibly low in the solid state, energy transfer from the OPV to PBI chromophore was not expected. FIG. 8 also shows the emission from the PBI alone polymer i.e. PS-PBI-0.16 upon excitation at 350 nm. PBIX had reasonable absorption at 350 nm resulting in direct excitation of perylene upon excitation at 350 nm suggesting that selective excitation of OPV was not possible in the PS-PBI-0.82-OPV-0.88 polymer. Excitation at 490 nm resulted in strong emission from PBI in the case of PS-PBI-0.82-OPV-0.88. The quantum yield for the PBI emission in PS-PBI-0.82-OPV-0.88 was quite high at 0.33 compared to that for OPV which was 0.20.

Figure 20A:
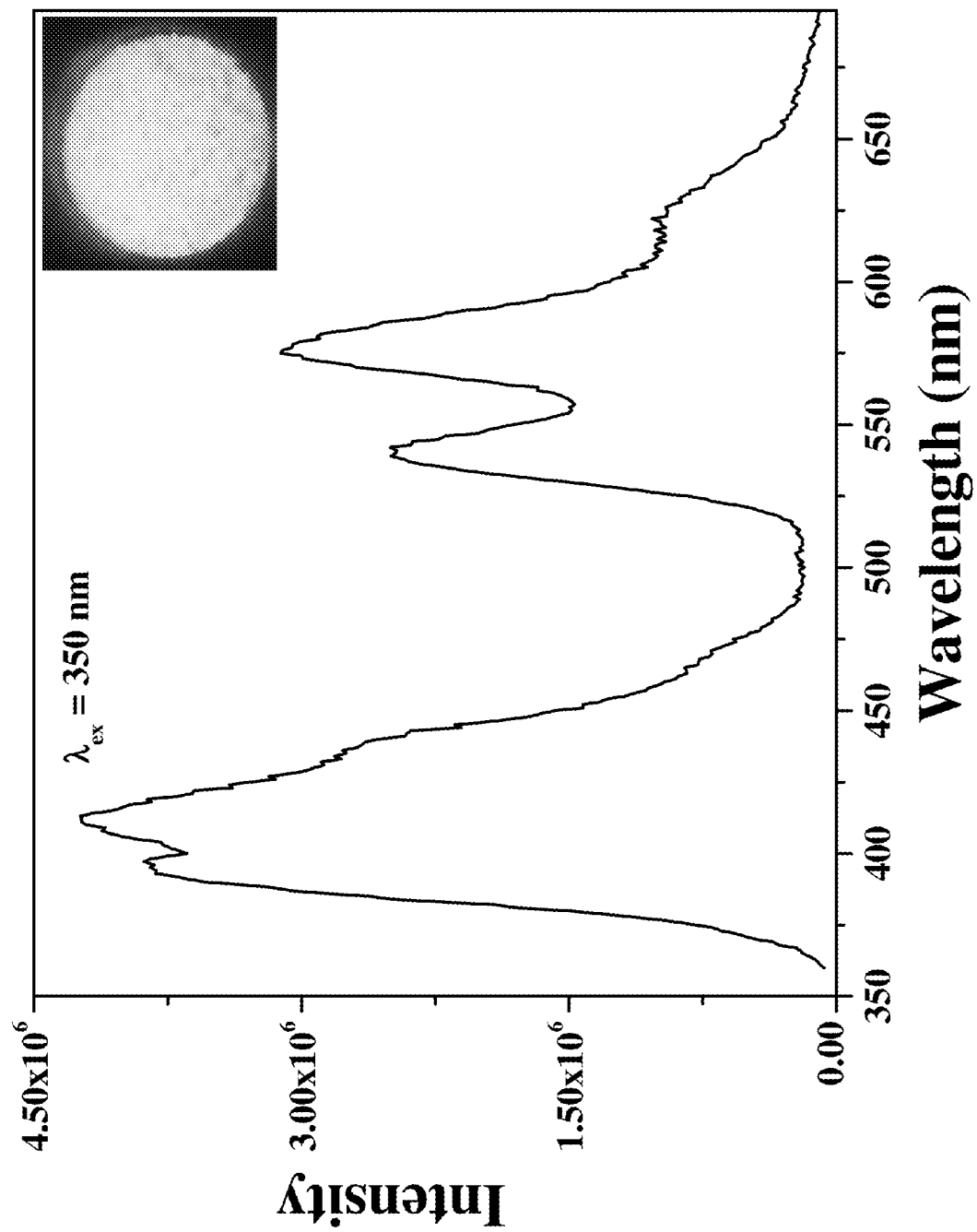
Figure 20B:
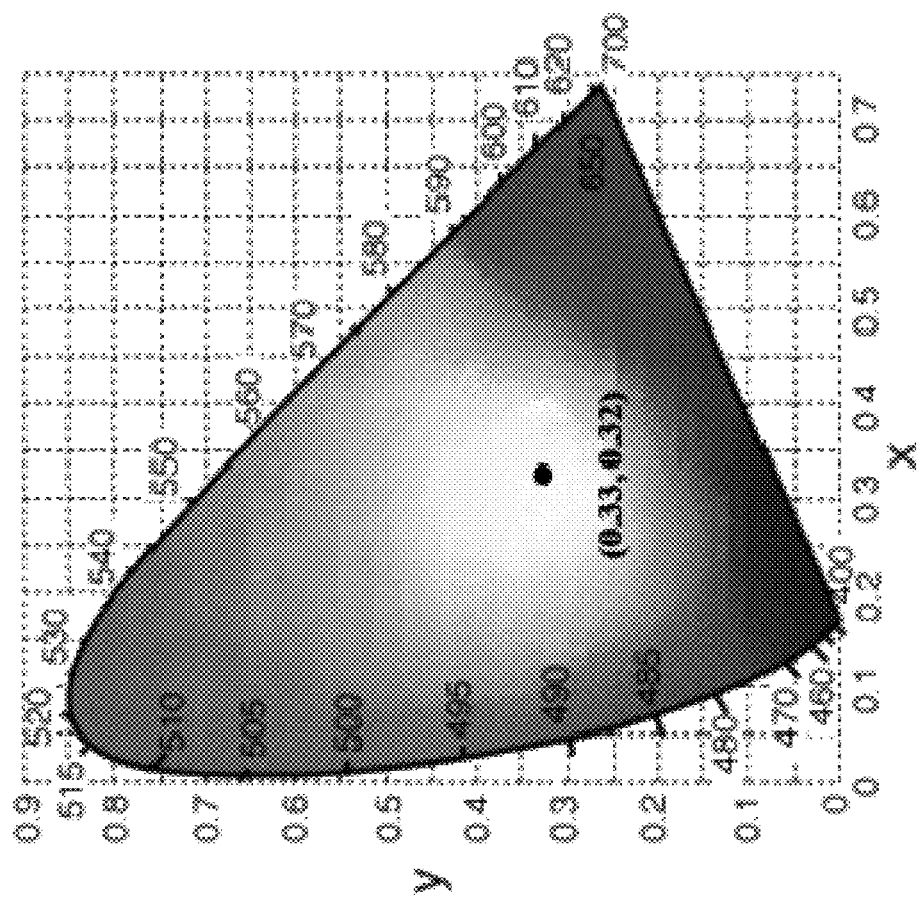

The highlight of the present work was the solid state monomeric (non-aggregated) emission from the crosslinked monodispersed, thermally stable PS beads. The very pale pink colored PS-PBITEG-X and colorless PS-OPV-X samples upon observation under hand-held UV lamp emitted intense orange and blue fluorescence respectively. Further FIG. 19 shows the images of the powdered PS samples both under normal and UV light. FIG. 20a shows the solid state (powder form) emission spectra of the polymer PS-PBITEG-6.25-OPV-4.28 upon excitation at 350 nm. It showed peaks corresponding to OPV as well as PBI emission in the range 350 to 500 nm and 520 to 675 nm respectively. The inset in the figure shows the photograph of the white light emission from the powder sample as observed under a hand-held UV lamp. The purity of the white light emission was assigned in photochromic terms, as standardized by commission International d'Eclairage, and the CIE coordinates was obtained as (0.33, 0.32: FIG. 20b), which was quite close to that of pure white light emission (0.33, 0.33). The emission in the powder form of all the PS samples upon excitation at 350 nm is given in FIG. 21a and their CIE chromaticity diagram is included in FIG. 21b. The CIE coordinates varied from (0.15, 0.10) for the blue emitting PS-OPV-3.88 to (0.45, 0.48) for the orange yellow emitting PS-PBITEG-6.25. The quantum yield for solid state emission $\phi_{powder}$ was measured using an integrating-sphere Quanta φ Horiba attachment with 490 nm excitation for PBI and 350 nm for OPV respectively and the values are given in Table 3b. PS-OPV-3.88 exhibited the quantum yield value of 0.72 ($\lambda_{exc}$=350 nm), while PS-PBITEG-6.25 had a $\phi_{powder}$ of 0.21 ($\lambda_{exc}$=490 nm). The polymers with varying incorporation of both fluorophores exhibited $\phi_{powder}$ values ranging from 0.28 to 0.13 for blue OPV emission ($\lambda_{exc}$=350 nm; range 360-510 nm) and 0.26 to 0.21 for PBI emission in the range 500 to 700 nm ($\lambda_{exc}$=490 nm). It can be seen from table 3b that the quantum yield for PBI emission was not much affected by the presence of the OPV chromophore, whereas considerable reduction was observed in the OPV emission when PBI was also incorporated into the PS backbone.

According to the invention highly emitting fluorophores incorporated into a polymer scaffold in the form of crosslinker and achieved fluorescent polymer beads with intense emission from the non-aggregated chromophore[17] in the solid state. The absolute quantum yield of the powder sample as well as solution is very significant. The strategy allows the incorporation of simultaneous addition of multiple fluorophores emitting in different colors makes it very convenient to use for labeling studies where one can access different emission regions just by exciting at the appropriate wavelength without having to label with different fluorophores.

Consequently, the invention provides a series of crosslinked Polystyrene microbeads incorporating fluorophores like perylene bisimide (PBI) and oligo(p-phenylenevinylene) (OPV) as the crosslinker are developed by two stage dispersion polymerization strategy. The dispersion polymerization is more tolerant to rigid aromatic molecules with poor solubility, and allowed their incorporation into the polymer backbone and maintained control over the particle size distribution. Thus, using this strategy up to ~5×10$^{-6}$ moles of the rigid fluorophores could be incorporated into PS backbone. The fluorescent spherical crosslinked PS beads had an average diameter of 2-3 μm. The PS beads incorporating crosslinkers exhibited intense colour emission in the solid state with high quantum yield ($\phi_{Powder}$=0.25 to 0.71).

The monomer emission (no emission from aggregate) with high quantum efficiency has been achieved from fluorophores based on PBI and OPV, which are known to undergo π-π stacking interaction of their aromatic core in the solid state and even in highly concentrated form in solution resulting in quenching of their emission. The current fluorescent microbeads with stable intense emission find application in various areas

EXAMPLES

The following examples are given by way of illustration and therefore should not be construed to limit the scope of the present invention.

Materials

Perylene-3,4,9,10-tetracarboxylic dianhydride (PTCDA), 3-pentadecyl phenol, zinc acetate, imidazole, poly (vinylpyrrolidone) (PVP, Mw 360,000 g/mol), acrylic acid, 4-methoxyphenol, 2-ethylhexylbromide, triethylphosphite, 4-hydroxy benzaldehyde and potassium-tert-butoxide were purchased from Aldrich and used without further purifications. Styrene (Aldrich) was washed with sodium hydroxide followed by water, dried overnight using calcium chloride and vacuum distilled before use. HBr in glacial acetic acid, para-formaldehyde, potassium carbonate, potassium iodide, dimethyl sulfoxide, dimethyl formamide (DMF), tetrahydrofuran (THF), dichloromethane (DCM), and 2-chloroethanol were purchased locally and purified using standard procedures. Triton X-100 (70% solution in water) and 2,2'-azobis-(isobutyronitrile) (AIBN) were purchased from Merck and the latter was recrystallised from Methanol.

Measurements $^1$H and $^{13}$C NMR spectra were recorded in CDCl$_3$ using Bruker AVENS 200 MHz spectrophotometer. Chemical shifts (δ) are reported in ppm at 298 K, with trace amount of tetramethylsilane (TMS) as internal standard. MALDI-TOF analysis was carried out on a Voyager-De-STR MALDI-TOF (Applied Biosystems, Framingham, Mass., USA) instrument equipped with 337 nm pulsed nitrogen laser used for desorption and ionization. The mode of operation was in a reflector mode with an accelerating voltage of 25 kV. Micromolar solutions of the compounds in THF were mixed with Dithranol matrix and spotted on stainless steel MALDI plate and dried well. Size exclusion chromatography (SEC) in chloroform was done using polystyrene standards for calibration using a polymer lab PL-220 GPC instrument. The flow rate of the chloroform was maintained as 1 mL throughout the experiments, and 2-3 mg in 1 mL of the samples were filtered and injected for recording the chromatograms at 30° C. Thermogravimetric analysis (TGA) was performed using a PerkinElmer STA 6000 thermogravimetric analyser. Samples were run from 40 to 800° C. with a heating rate of 10° C./min under nitrogen. Absorption spectra were recorded using Perkin-Elmer Lambda 35 UV-spectrophotometer. Steady-state fluorescence studies were performed using Horiba Jobin Yvon Fluorolog 3 spectrophotometer having a 450 W xenon lamp. The emission and excitation slit width was maintained at 1 nm throughout the experiments, and the data was obtained in "S1/R1" mode (to account for the variations in lamp intensity). The solid state quantum yield was measured using a Model F-3029, Quanta-Phi 6" Integrating Sphere connected with a Horiba Jobin Yvon Fluorolog 3 spectrophotometer. FEI, QUANTA 200 3D Scanning Electron Microscope with tungsten filament as electron source was used for recording SEM images. 1 mg of polymer dispersed in 2 mL of ethanol was drop cast on silicon wafers and the solvent was allowed to evaporate at room temperature in air for 12 hours. Before recording the morphology, films were coated by 5 nm thick gold film by sputtering method. Transmission Electron microscopy (TEM) was done using an FEI-Tecnai™-F20 electron microscope operating at 200 kV. 0.5 mg of polymer dispersed in 2 mL of ethanol was deposited directly on carbon coated copper grid and the solvent was allowed to evaporate at room temperature in air for 12 hours. DLS measurements were carried out on Zetasizer ZS 90 apparatus, utilizing 633 nm red laser (at 90° angle) from Malvern instruments. The reproducibility of the data was checked at least three times using freshly prepared independent polymer solutions. The fluorescence microscopic images were taken by Epi-fluorescence microscope Leitz Labor Lux, Germany and images were observed by a cannon power shot S-80 camera. (Excitation wavelength: 488-520 nm, green filter for OPV, and 550-550 nm, red filter for PBI). For sample preparation, very dilute dispersion of polymers in ethanol was drop cast on to glass plate, covered with cover slip and directly observed under fluorescence microscope.

Example 1

Synthesis of PBI-PDP-TEG Diol

The synthesis of the symmetric PDP substituted perylene bisimided derivative (PBI-PDP-diol) is reported in our earlier publication (Bhaysar, G. A.; Asha, S. K. Chem. Eur. J. 2011, 17, 12646-12658).

In a two necked round bottom flask attached with reflux condenser, PBI-PDP-Diol 3.5 g, (0.0035 mol), KI (0.02 g) and 4.88 g, (0.035 mol) $K_2CO_3$ were taken along with 150 mL of dry DMF under $N_2$ atmosphere. The reaction mixture was refluxed for one hour and then brought to room temperature (25° C.). 2.8 g (0.008 mol) of TEG-monotosylate in DMF was added over a period of thirty minutes at 0° C. to the above reaction mixture. The reaction mixture was stirred for 1.5 hours at 0-5° C., following which it was refluxed for 48 h at 85-90° C. The reaction was monitored by TLC. For workup, the reaction mixture was cooled to 25° C. and poured into 20% HCl solution. The precipitate was filtered, washed with water and dried under vacuum at 75° C. for 12 h. The compound was purified by column chromatography in DCM/methanol (5%) as solvent. Yield=3.7 g (58%). $^1$H NMR (200 MHz, CDCl3, δ ppm): 8.8-8.7 (m, 8H, Perylene ring), 7.13 (dd, 2H, Ar-PDP), 6.96 (m, 4H, Ar-PDP), 4.55 (t, 4H, Ar—OCH$_2$), 4.21 (t, 4H, Ar—OCH$_2$), 3.92-3.75 (bm, 24H), 2.37 (t, 4H), 1.51 (m, 4H), 1.08-1.19 (m, 48H, alkyl chain), 0.84 (t, 6H). MALDI-TOF MS (Dithranol matrix): m/z calcd for $C_{82}H_{110}N_2O_{14}$: 1346.80. found 1346.60+23 [M+Na$^{30}$] 1346.60 [M+K$^+$].

Example 2

Synthesis of PBIX

In a 250 mL two necked round bottom flask, 1.00 g (0.00075 mol) of PBI-PDP-TEG diol, $Et_3N$ 0.4 mL, (0.0037 mol), and dry DCM (80 mL) were taken under nitrogen atmosphere and stirred well at 0° C. for half hour. Acryloyl chloride 0.3 mL, (0.0037 mol) in DCM was added to the reaction mixture over a period of 15-20 minutes at 0° C. Reaction was carried out for 24 h at room temperature and monitored by TLC. For workup, the organic layer was washed with water and brine and extracted into DCM. The compound was purified by column chromatography in DCM/methanol (5%) as solvent. Yield=0.7 g (70%). $^1$H NMR (200 MHz, CDCl$_3$, δppm): 8.72 (m, 8H, Perylene ring), 7.11 (dd, 2H, Ar-PDP), 6.98 (m, 4H, Ar-PDP), 6.38 (dd, 2H, acrylic double bond), 6.17 (q, 2H, acrylic double bond), 5.85 (dd, 2H, acrylic double bond), 4.33 (t, 4H, Ar—OCH$_2$), 4.20 (t, 4H, Ar—OCH$_2$), 3.89-3.74 (bm, 24H), 2.4 (t, 4H), 1.51 (m, 4H), 1.08-1.19 (m, 48H, alkyl chain), 0.84 (t, 6H). $^{13}$C NMR (400 MHz, CDCl$_3$) 166.1, 163.58, 159.1, 141.5, 134.8, 131.8, 131.0, 129.6, 128.2, 126.5, 123.4, 123.2, 116.0, 112.6, 70.8, 70.6, 69.1 67.4, 63.7, 31.8, 29.6, 29.5, 29.3, 27.2, 22.6, 14.1. MALDI-TOF MS (Dithranol matrix): m/z calcd for $C_{40}H_{42}N_2O_4$: 1456.8. found 1479+23 [M+Na$^+$], 1479+23+39 [M+Na$^+$K$^+$], 1478+39+39 [M+2K$^+$].

Example 3

Synthesis of OPV Cross Linker

The symmetric OPV diol was synthesized as reported in literature (J. Polym. Sci.: Part A: Polym. Chem. 2008, 46, 5897-5915).

In a 250 mL two necked round bottom flask, 1.1 g (0.00196 mol) of OPV Diol was taken along with $Et_3N$ 1 mL (0.01 mol) and dry Dichloro methane (DCM) (80 mL) under nitrogen atmosphere and stirred well at 0° C. for half an hour. Acryloyl chloride 0.64 mL (0.0078 mol) in DCM was added to the reaction mixture for a period of 15-20 min at 0° C. The reaction was carried out for 24 h at room temperature and monitored by TLC. For workup, the organic layer was evaporated and the compound was purified by column chromatography in 20% ethyl acetate/pet ether solvent combination. Yield=0.45 gm (41%) $^1$H NMR (200 MHz, CDCl$_3$, δppm): 7.46-6.92 (3m, 14H, Ar—H, and vinylic H), 6.41 (dd, 2H, acrylic double bond), 6.18 (m, 2H, acrylic double bond), 5.89 (dd, 2H, acrylic double bond), 4.52 (m, 2H, ArOCH$_2$), 4.23 (m, 2H, C(O)OCH$_2$), 3.90 (s, 3H, ArOCH$_3$) 3.90 (d, 2H, ArOCH$_2$), 1.70-1.37 (m, 9H, alkyl protons), 0.97-0.90 (t, 6H). $^{13}$C NMR (400 MHz, CDCl$_3$) 165.8, 157.7, 151.0, 150.9, 131.0, 127.8, 127.5, 127.4, 126.4, 121.2, 114.6, 109.9, 108.7, 71.5, 65.7, 62.6, 56.1, 39.5, 30.6, 29.0, 23.9, 22.8, 13.8, 11.0 MALDI-TOF MS (Dithranol matrix): m/z calcd for $C_{41}H_{48}O_8$: 668.8. found 668.5 [M$^+$].

Example 4

Synthesis of PBITEG (Perylene Bisimide Tetraethyleneglycolediacrylate)

In a 250 mL two necked round bottom flask, PBI-TEG diol (0.65 gm), Et3N 0.58 ml (4.3×10−3 mol) and dry DCM (100 ml) were taken under nitrogen atmosphere and stirred well at 00 C for half hour. Acryloyl chloride 0.35 ml, (4.3×10−3 mol) in DCM was added to the reaction mixture over a period of 15-20 minutes at 00 C. Reaction was carried out for 24 hours at room temperature and monitored by TLC. For workup, the organic layer was washed with water and brine and extracted into DCM. The compound was purified by column chromatography in DCM/methanol (1%) as solvent. Yield=0.7 gm (crude). $^1$H NMR (200 MHz, CDCl3, δ ppm): 8.64 (m, 8H, Perylene ring), 6.35 (dd, 2H, acrylic double bond), 6.13 (q, 2H, acrylic double bond), 5.82 (dd, 2H, acrylic double bond), 4.46 (t, 4H, —OCH$_2$), 4.24 (t, 4H, —NCH$_2$), 3.86 (t, 4H), 3.60-3.71 (m, 20H), $^{13}$C NMR (500 MHz, CDCl$_3$) 165.88, 162.95, 134.01, 130.93, 13.75, 128.85, 127.97, 125.78, 122.81, 122.68, 70.41, 70.30, 69.83 68.80, 63.39, 39.03. MALDI-TOF MS (Dithranol matrix): m/z calcd for $C_{46}H_{46}N_2O_{14}$: 850.29. found 850.29+23 [M+Na$^+$] 850.29 [M+K$^+$]. After column=0.25 gm.

Example 5

Two Stage Dispersion Polymerization Procedure to Prepare PS-PBI/OPV-X

The stabilizer (PVP), the co-stabilizer (Triton X-305), initiator (AIBN) and half of the styrene monomer and ethanol were added to a 250 mL three necked reaction flask equipped with a gas inlet, overhead stirrer and rubber septum. After a homogeneous solution formed at room temperature, the solution was deoxygenated by bubbling nitrogen gas at room temperature for at least 30 min. Then the flask was placed in a 70° C. oil bath and stirred mechanically at 120 rpm. The cross-linker (PBIX/OPVX) (PBITEGX/OPVX) was dissolved in the remaining styrene and ethanol at 60° C. under nitrogen. After the crosslinker had dissolved and the polymerization reaction had run for 1 h, the hot Styrene-crosslinker solution was added into the reaction flask over a period of 3 h (drop by drop addition). The reaction was continued for 4 h under continuous flow of nitrogen with overhead stirring. The precipitated polymer in the reaction medium was washed with 200 ml×4 times of methanol and separated by centrifuge. The polymer was dried under vacuum at 50° C. for 6 h. The polymerization recipe is given in table 1.

Advantages of the Invention

The advantage of adapting the fluorophore itself as the crosslinker is two-fold. One, fluorescent crosslinked polymer particles could be obtained in one shot without having to add two ingredients—the fluorophore and the crosslinker separately in the reaction medium and the covalent attachment of the dye to the polymer backbone avoided dye leakage. The second and most appealing reason is the ability of maximum emission from very low fluorophore incorporation as larger incorporation of fluorophores like PBI and OPV are known to result in aggregation induced quenching.

An added advantage of instant strategy of fluorophore as crosslinker is the ability to incorporate more than one tailor-made fluorophore into the PS backbone enabling fine-tuning of the emission colors.

An added advantage of the said invention is Single polymer based white light and multicolor emission in the solid state. Fluorescent polystyrene microbeads in the size range of 2-3 μm were produced by incorporating orange-red emitting Perylenebisimide and blue emitting Oligo (p-phenylenevinylene) as crosslinkers into the polymer backbone. Pure white light emission in the powder form with CIE coordinates (0.33, 0.32) was achieved with one of the PS samples having appropriate amounts of OPV and PBI-PS-PBITEG-6.25-OPV-4.28.

The dispersion polymerisation strategy employed in the invention is easy and scalable towards thermally stable fluorescent crosslinked polymer beads, where the fluorophore is covalently incorporated in the polymer backbone, thereby avoiding fluorophore leakage.

The tunability of the emission colors with more than one color from the same polymer particle makes it very convenient to use for labeling studies where one can access different emission regions just by exciting at the appropriate wavelength without having to label with different fluorophores. The versatility of the method allows for extending the approach to other commercially important polymers.

The instant process of making is two stage dispersion polymerization, where cross linker acts as fluoresces makes the process cost effective. The crosslinkers incorporated polymer not only fluoresces in solution state but also in solid state. Further the process is industrially viable, easy and reproducible.

What is claimed is:

1. A fluorescent cross-linked polymer, comprising:
   a fluorescent chromophore as a cross linker incorporated into polystyrene (PS), wherein the cross linker is a combination of: PBITEGA

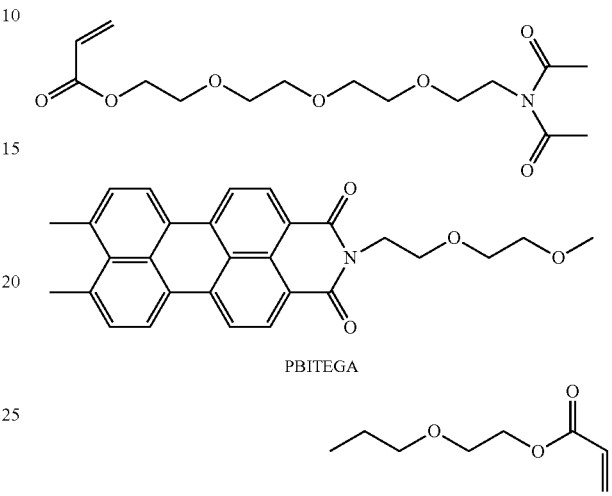

PBITEGA and OPVX

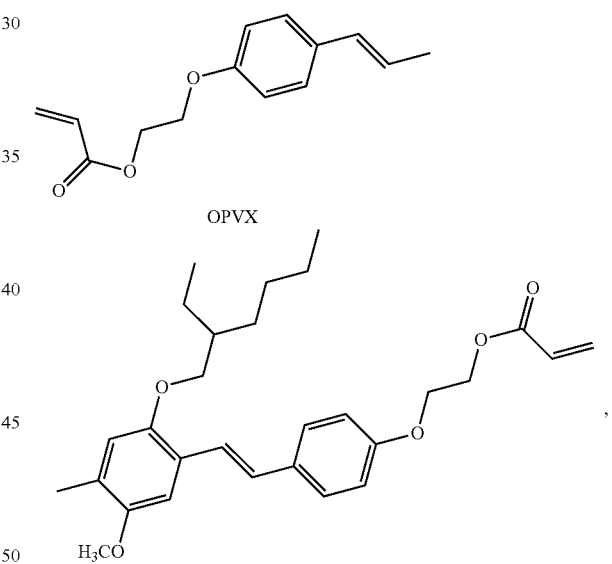

OPVX wherein the fluorescent cross-linked polymer emits white light fluorescence in solid state and solution state, and has a quantum yield in the range of (φPowder) 0.25 to 0.71 at an excitation wavelength of about 350 nm to about 490 nm.

2. The fluorescent cross-linked polymer as claimed in claim 1, wherein the amount of the crosslinker is in the range of 3.4 to 14 μM with respect to styrene monomer.

3. The fluorescent cross-linked polymer as claimed in claim 1, wherein the fluorescent cross-linked polymer is obtained in the form of microbeads, microspheres, balls, micro particles, or nanospheres.

4. The fluorescent cross-linked polymer as claimed in claim 3, wherein the fluorescent cross-linked polymer is obtained in the form of microbeads having an average diameter of 2-6 μm.

5. The fluorescent cross-linked polymer as claimed in claim 4, wherein the fluorescent cross-linked polymer is obtained in the form of microbeads having an average diameter of 2-3 μm.

6. A process for the preparation of fluorescent cross-linked polymer as claimed in claim 1, comprising: dispersion of additives to polymer beads followed by dispersion of fluorophore crosslinkers to the same to obtain monodisperse, fluorescent chromophore crosslinked polymer.

7. The process according to claim 6, wherein the additives are selected from the group consisting of: solvent medium selected from methanol, ethanol, and dichloromethane; surfactant/co-stabilizer; stabilizer; and initiator.

8. The process according to claim 7, wherein the surfactant/co-stabilizer is t-octyl phenoxy polyethoxyethanol, the stabilizer is polyvinylpyrrolidone, and/or the initiator is azobisisobutyronitrile.

* * * * *